(12) United States Patent
Kodaka et al.

(10) Patent No.: US 12,474,177 B2
(45) Date of Patent: Nov. 18, 2025

(54) MAP DATA UPDATE APPARATUS AND MAP DATA UPDATE METHOD

(71) Applicant: Mitsubishi Electric Corporation, Tokyo (JP)

(72) Inventors: Yasushi Kodaka, Tokyo (JP); Mitsuo Shimotani, Tokyo (JP); Seigo Kanazawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 290 days.

(21) Appl. No.: 18/018,916

(22) PCT Filed: Oct. 8, 2020

(86) PCT No.: PCT/JP2020/038164
§ 371 (c)(1),
(2) Date: Jun. 12, 2023

(87) PCT Pub. No.: WO2022/074792
PCT Pub. Date: Apr. 14, 2022

(65) Prior Publication Data
US 2023/0304825 A1    Sep. 28, 2023

(51) Int. Cl.
*G01C 21/00*  (2006.01)
*B60W 60/00*  (2020.01)
*G06F 16/2457*  (2019.01)

(52) U.S. Cl.
CPC ....... *G01C 21/3804* (2020.08); *B60W 60/001* (2020.02); *G01C 21/387* (2020.08); *B60W 2556/40* (2020.02)

(58) Field of Classification Search
CPC .............. G01C 21/3804; G01C 21/387; G01C 21/3859; B60W 60/001; B60W 2556/40

USPC ......................................................... 707/730
See application file for complete search history.

(56) References Cited

U.S. PATENT DOCUMENTS

2006/0173614 A1* 8/2006 Nomura ............ G01C 21/3881
                                                              701/425
2006/0190166 A1   8/2006 Ohira et al.
2007/0271036 A1* 11/2007 Atarashi ............ G01C 21/3889
                                                              701/446

(Continued)

FOREIGN PATENT DOCUMENTS

JP        2006-220524 A      8/2006
WO    WO 2012/095974 A1    7/2012

OTHER PUBLICATIONS

International Search Report (PCT/ISA/210), issued in PCT/JP2020/038164, dated Dec. 22, 2020.

*Primary Examiner* — Kuen S Lu
(74) *Attorney, Agent, or Firm* — Birch, Stewart, Kolasch & Birch, LLP

(57) ABSTRACT

It is an object of the present disclosure to provide a technique to make it possible to reduce data size of a file used for managing an update of a mesh file. A map data update apparatus updates a specific mesh file on the basis of an update necessity management file having a bit array in which respective positions of a plurality of bits are associated with respective mesh IDs of a plurality of mesh files, in which 1-bit flag information indicating the necessity of an update of the mesh file is stored at the position corresponding to the mesh ID of the mesh file in the bit array and the mesh ID of the specific mesh file.

13 Claims, 21 Drawing Sheets

(56) References Cited

U.S. PATENT DOCUMENTS

| | | | |
|---|---|---|---|
| 2012/0130944 A1* | 5/2012 | Masuda | G01C 21/3878 |
| | | | 707/E17.01 |
| 2013/0038625 A1* | 2/2013 | Nakajima | G06T 11/203 |
| | | | 345/611 |
| 2019/0243336 A1* | 8/2019 | Joy | G05B 19/4069 |
| 2019/0313224 A1* | 10/2019 | Yu | H04L 67/12 |
| 2023/0304825 A1* | 9/2023 | Kodaka | G01C 21/3804 |

* cited by examiner

F I G. 1
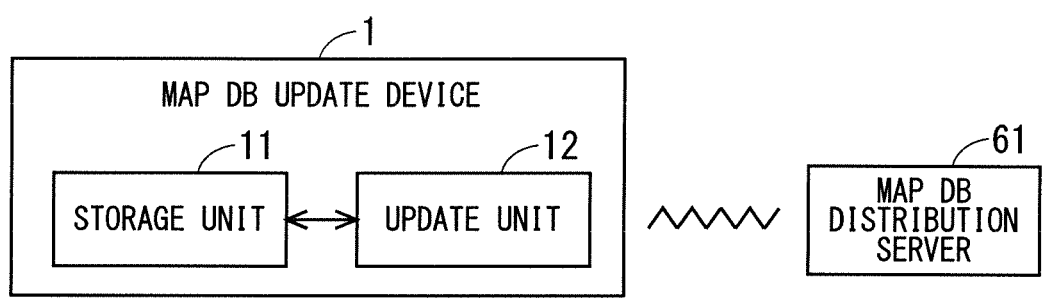

| 31 | 32 | 33 | 34 | 35 |
|----|----|----|----|----|
| 26 | 27 | 28 | 29 | 30 |
| 21 | 22 | 23 | 24 | 25 |
| 16 | 17 | 18 | 19 | 20 |
| 11 | 12 | 13 | 14 | 15 |
| 06 | 07 | 08 | 09 | 10 |
| 01 | 02 | 03 | 04 | 05 |

FIG. 4B

MAP DB (Ver. n)
- VERSION MANAGEMENT FILE (vn)
- MESH FILE (01) (vn)
- MESH FILE (02) (vn)
- ...
- MESH FILE (M) (vn)

FIG. 4C

FILE NAME : Ver. 000n

| ADDRESS (WORD) | MESH ID | VERSION |
|---|---|---|
| 0000 | 01 | Ver. 3 |
| 0001 | 02 | Ver. 2 |
| 0002 | 03 | Ver. 2 |
| 0003 | 04 | Ver. 1 |
| 0004 | 05 | Ver. 1 |
| 0005 | 06 | Ver. 3 |
| 0006 | 07 | Ver. 3 |
| 0007 | 08 | Ver. 3 |
| ... | ... | ... |
| M-1 | M | Ver. 1 |

FIG. 4D

FILE NAME : Ver. 0001

| ADDRESS (WORD) | MESH ID | VERSION |
|---|---|---|
| 0000 | 01 | Ver. 1 |
| 0001 | 02 | Ver. 1 |
| 0002 | 03 | Ver. 1 |
| 0003 | 04 | Ver. 1 |
| 0004 | 05 | Ver. 1 |
| 0005 | 06 | Ver. 1 |
| 0006 | 07 | Ver. 1 |
| 0007 | 08 | Ver. 1 |
| ... | ... | ... |
| M-1 | M | Ver. 1 |

F I G. 5
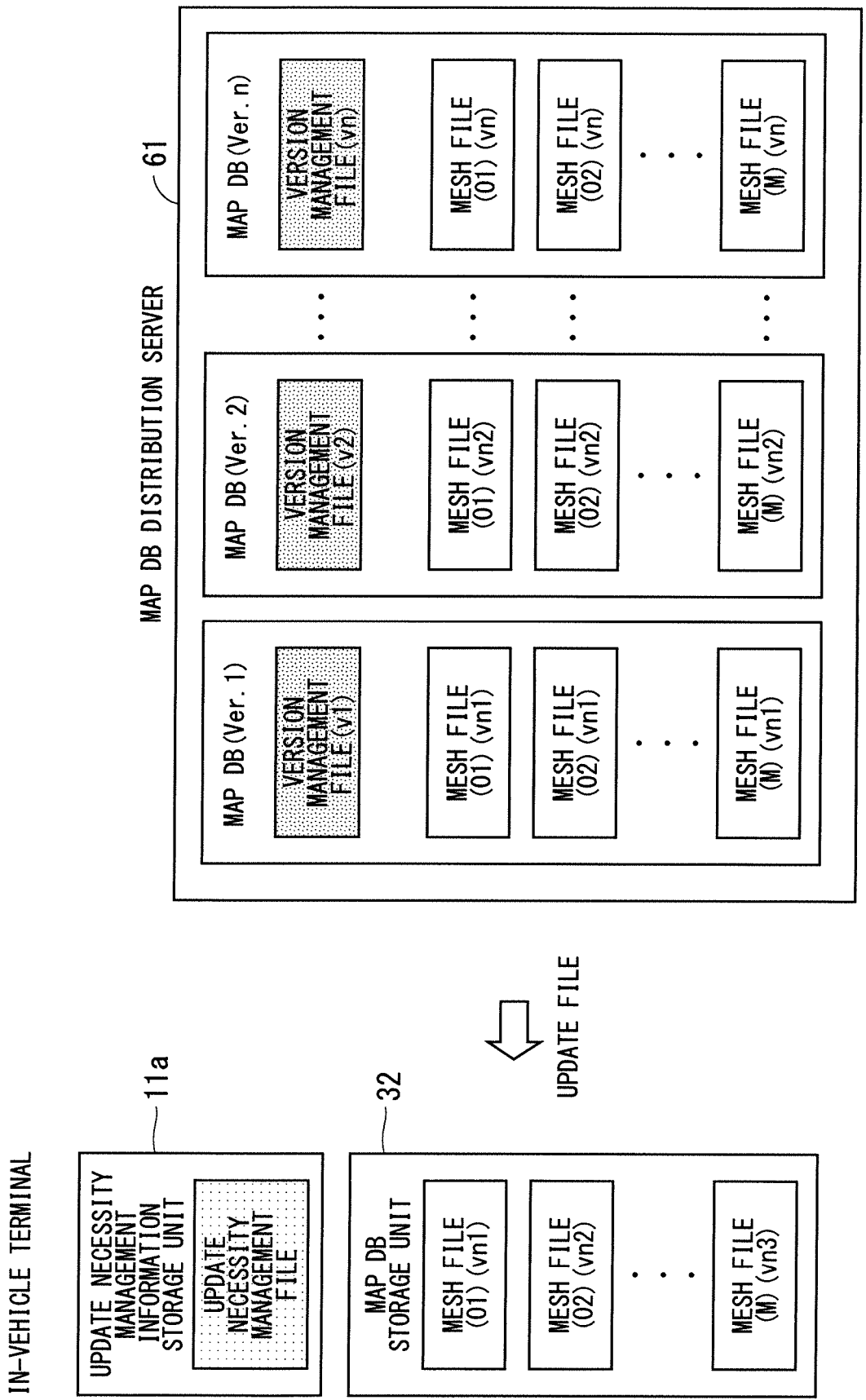

FIG. 9A

VERSION MANAGEMENT FILE (Ver.1)

| ADDRESS (WORD) | MESH ID | VERSION |
|---|---|---|
| 0000 | 01 | Ver.1 |
| 0001 | 02 | Ver.1 |
| 0002 | 03 | Ver.1 |
| 0003 | 04 | Ver.1 |
| 0004 | 05 | Ver.1 |
| 0005 | 06 | Ver.1 |
| 0006 | 07 | Ver.1 |
| 0007 | 08 | Ver.1 |

FIG. 9B

UPDATE NECESSITY MANAGEMENT FILE (INITIAL STATE)

| ADDRESS (bit) | MESH ID | UPDATE NECESSITY FLAG |
|---|---|---|
| 0000 | 01 | 0 |
| 0001 | 02 | 0 |
| 0010 | 03 | 0 |
| 0011 | 04 | 0 |
| 0100 | 05 | 0 |
| 0101 | 06 | 0 |
| 0110 | 07 | 0 |
| 0111 | 08 | 0 |

FIG. 9C

VERSION MANAGEMENT FILE (Ver.2)

| ADDRESS (WORD) | MESH ID | VERSION |
|---|---|---|
| 0000 | 01 | Ver.2 |
| 0001 | 02 | Ver.1 |
| 0002 | 03 | Ver.1 |
| 0003 | 04 | Ver.1 |
| 0004 | 05 | Ver.1 |
| 0005 | 06 | Ver.2 |
| 0006 | 07 | Ver.2 |
| 0007 | 08 | Ver.2 |

FIG. 9D

UPDATE FILE (Ver.2)

| ADDRESS (bit) | MESH ID | UPDATE FLAG |
|---|---|---|
| 0000 | 01 | 1 |
| 0001 | 02 | 0 |
| 0010 | 03 | 0 |
| 0011 | 04 | 0 |
| 0100 | 05 | 0 |
| 0101 | 06 | 1 |
| 0110 | 07 | 1 |
| 0111 | 08 | 1 |

FIG. 9E

UPDATE NECESSITY MANAGEMENT FILE (RELEASE OF Ver.2)

| ADDRESS (bit) | MESH ID | UPDATE NECESSITY FLAG |
|---|---|---|
| 0000 | 01 | 1 |
| 0001 | 02 | 0 |
| 0010 | 03 | 0 |
| 0011 | 04 | 0 |
| 0100 | 05 | 0 |
| 0101 | 06 | 1 |
| 0110 | 07 | 1 |
| 0111 | 08 | 1 |

FIG. 9F

UPDATE NECESSITY MANAGEMENT FILE (AT UPDATE OF MESH ID = 06)

| ADDRESS (bit) | MESH ID | UPDATE NECESSITY FLAG |
|---|---|---|
| 0000 | 01 | 1 |
| 0001 | 02 | 0 |
| 0010 | 03 | 0 |
| 0011 | 04 | 0 |
| 0100 | 05 | 0 |
| 0101 | 06 | 0 |
| 0110 | 07 | 1 |
| 0111 | 08 | 1 |

FIG. 10A VERSION MANAGEMENT FILE (Ver. 3)

| ADDRESS (WORD) | MESH ID | VERSION |
|---|---|---|
| 0000 | 01 | Ver. 3 |
| 0001 | 02 | Ver. 3 |
| 0002 | 03 | Ver. 3 |
| 0003 | 04 | Ver. 1 |
| 0004 | 05 | Ver. 1 |
| 0005 | 06 | Ver. 2 |
| 0006 | 07 | Ver. 2 |
| 0007 | 08 | Ver. 2 |

FIG. 10B UPDATE FILE (Ver. 3)

| ADDRESS (bit) | MESH ID | UPDATE FLAG |
|---|---|---|
| 0000 | 01 | 1 |
| 0001 | 02 | 1 |
| 0010 | 03 | 1 |
| 0011 | 04 | 0 |
| 0100 | 05 | 0 |
| 0101 | 06 | 0 |
| 0110 | 07 | 0 |
| 0111 | 08 | 0 |

FIG. 10C UPDATE NECESSITY MANAGEMENT FILE (AT UPDATE OF Ver. 3)

| ADDRESS (bit) | MESH ID | UPDATE NECESSITY FLAG |
|---|---|---|
| 0000 | 01 | 1 |
| 0001 | 02 | 1 |
| 0010 | 03 | 1 |
| 0011 | 04 | 0 |
| 0100 | 05 | 0 |
| 0101 | 06 | 0 |
| 0110 | 07 | 1 |
| 0111 | 08 | 1 |

FIG. 10D UPDATE NECESSITY MANAGEMENT FILE (AT UPDATE OF MESH ID = 03)

| ADDRESS (bit) | MESH ID | UPDATE NECESSITY FLAG |
|---|---|---|
| 0000 | 01 | 1 |
| 0001 | 02 | 1 |
| 0010 | 03 | 0 |
| 0011 | 04 | 0 |
| 0100 | 05 | 0 |
| 0101 | 06 | 0 |
| 0110 | 07 | 1 |
| 0111 | 08 | 1 |

FIG. 10E

| MESH ID | VERSION |
|---|---|
| 01 | Ver. 1 |
| 02 | Ver. 1 |
| 03 | Ver. 3 |
| 04 | Ver. 1 |
| 05 | Ver. 1 |
| 06 | Ver. 2 |
| 07 | Ver. 1 |
| 08 | Ver. 1 |

| 31 | 32 | 33 | 34 | 35 |
|----|----|----|----|----|
| 26 | 27 | 28 | 29 | 30 |
| 21 | 22 | 23 | 24 | 25 |
| 16 | 17 | 18 | 19 | 20 |
| 11 | 12 | 13 | 14 | 15 |
| 06 | 07 | 08 | 09 | 10 |
| 01 | 02 | 03 | 04 | 05 |

F I G. 1 4 A

| 31 | 32 | 33 | 34 | 35 |
|----|----|----|----|----|
| 26 | 27 | 28 | 29 | 30 |
| 21 | 22 | 23 | 24 | 25 |
| 16 | 17 | 18 | 19 | 20 |
| 11 | 12 | 13 | 14 | 15 |
| 06 | 07 | 08 | 09 | 10 |
| 01 | 02 | 03 | 04 | 05 |

F I G. 1 4 B

| 31 | 32 | 33 | 34 | 35 |
|----|----|----|----|----|
| 26 | 27 | 28 | 29 | 30 |
| 21 | 22 | 23 | 24 | 25 |
| 16 | 17 | 18 | 19 | 20 |
| 11 | 12 | 13 | 14 | 15 |
| 06 | 07 | 08 | 09 | 10 |
| 01 | 02 | 03 | 04 | 05 |

F I G. 1 4 C

|    |    |    |    |    |
|----|----|----|----|----|
| 31 | 32 | 33 | 34 | 35 |
| 26 | 27 | 28 | 29 | 30 |
| 21 | 22 | 23 | 24 | 25 |
| 16 | 17 | 18 | 19 | 20 |
| 11 | 12 | 13 | 14 | 15 |
| 06 | 07 | 08 | 09 | 10 |
| 01 | 02 | 03 | 04 | 05 |

F I G.  1 8 A

|    |    |    |
|----|----|----|
| 07 | 08 | 09 |
| 04 | 05 | 06 |
| 01 | 02 | 03 |

F I G.  1 8 B

|    |    |
|----|----|
| 03 | 04 |
| 01 | 02 |

F I G.  1 8 C

MAP DATA UPDATE APPARATUS AND MAP DATA UPDATE METHOD

TECHNICAL FIELD

The present disclosure relates to a map data update apparatus and a map data update method.

BACKGROUND ART

In an in-vehicle terminal such as a navigation device or the like, a map database (hereinafter, database is sometimes abbreviated to a "DB") including data of roads on a map, or the like is used. In order to reflect the latest road conditions in the real world on the map DB of the in-vehicle terminal, variously proposed is a technique in which a map DB distribution server distributes (transmits) the latest map DB to the in-vehicle terminal and the in-vehicle terminal updates the map DB on the basis of the map DB from the map DB distribution server. By this technique, when the map DB of the map DB distribution server is updated regularly or irregularly, the map DB is stored into the map DB distribution server, and every time when the map DB of a new version is generated, the map DB of the corresponding version is distributed.

A national or specific range of the map DB is represented by an aggregate of a plurality of areas obtained by dividing the range by a specific rectangle referred to as a mesh (parcel). When the in-vehicle terminal updates the map DB, the in-vehicle terminal requests the map DB distribution server to upgrade the version of the map DB (update the version thereof) and updates the map DB to the latest one at the point in time when the map DB distribution server distributes the map DB. Patent Document 1 proposes a configuration in which with respect to each mesh, stored is a version upgrade list (version upgrade management file) in which flags each indicating whether there is an update or not for each version are listed.

PRIOR ART DOCUMENTS

Patent Document(s)

[Patent Document 1] International Publication No. 2012/095974

SUMMARY

Problem to be Solved by the Invention

In recent years, as to a plurality of mesh files indicating maps in a plurality of mesh areas, it is required that instead of all the mesh files, only necessary mesh files are updated to the latest ones in real time.

In a conventional map data update device, however, since the data size of a file used for managing the update of the mesh files is relatively large, there arises a problem that the real-time property as to the update of the mesh files is deteriorated. Particularly, in the ADAS (Advanced Driver Assistance System), AD (Automated Driving), or the like in which an update of the mesh files is frequently performed in order to maintain the high accuracy of a high accuracy map DB including road shapes on a lane basis, the real-time property is important.

Then, the present disclosure is intended to solve the above problem, and it is an object of the present disclosure to provide a technique to make it possible to reduce data size of a file used for managing an update of a mesh file.

Means to Solve the Problem

The present disclosure is intended for a map data update apparatus for selectively updating a plurality of mesh files each corresponding to one or more of a plurality of meshes obtained by dividing map data, by performing communication with a server. The map data update apparatus includes a storage unit for storing an update necessity management file having a bit array in which respective positions of a plurality of bits are associated with respective mesh IDs of the plurality of mesh files, in which 1-bit flag information indicating the necessity of an update of the mesh file is stored at the position corresponding to the mesh ID of the mesh file in the bit array and an update unit for updating a specific mesh file which is a mesh file specified as a target used in a vehicle among the plurality of mesh files, on the basis of a mesh ID of the specific mesh file and the update necessity management file, and updating the update necessity management file on the basis of an update result of the specific mesh file and received information received from the server.

Effects of the Invention

According to the present disclosure, used is the update necessity management file having a bit array in which respective positions of a plurality of bits are associated with respective mesh IDs of the plurality of mesh files, in which 1-bit flag information indicating the necessity of an update of the mesh file is stored at the position corresponding to the mesh ID of the mesh file in the bit array. With such a configuration, it is possible to reduce data size of a file used for managing an update of a mesh file.

These and other objects, features, aspects and advantages of the present disclosure will become more apparent from the following detailed description of the present disclosure when taken in conjunction with the accompanying drawings.

BRIEF DESCRIPTION OF DRAWINGS

FIG. 1 is a block diagram showing a configuration of a map DB update device in accordance with a first preferred embodiment;

FIG. 2 is a view showing exemplary data of an update necessity management file in accordance with the first preferred embodiment;

FIGS. 4A to 4D are views showing a relation among mesh areas, mesh files, and a version management file in accordance with the second preferred embodiment;

FIG. 5 is a view showing various files stored in the in-vehicle terminal and a map DB distribution server;

FIGS. 9A to 9F are parts of a flowchart showing an exemplary operation of the in-vehicle terminal in accordance with the second preferred embodiment;

FIGS. 10A to 10E are parts of a flowchart showing an exemplary operation of the in-vehicle terminal in accordance with the second preferred embodiment;

FIGS. 14A to 14C are views showing mesh areas in accordance with the third preferred embodiment;

FIGS. 18A to 18C are views showing mesh areas in accordance with a variation 2 of the third preferred embodiment;

DESCRIPTION OF EMBODIMENT(S)

The First Preferred Embodiment

Figure 3:
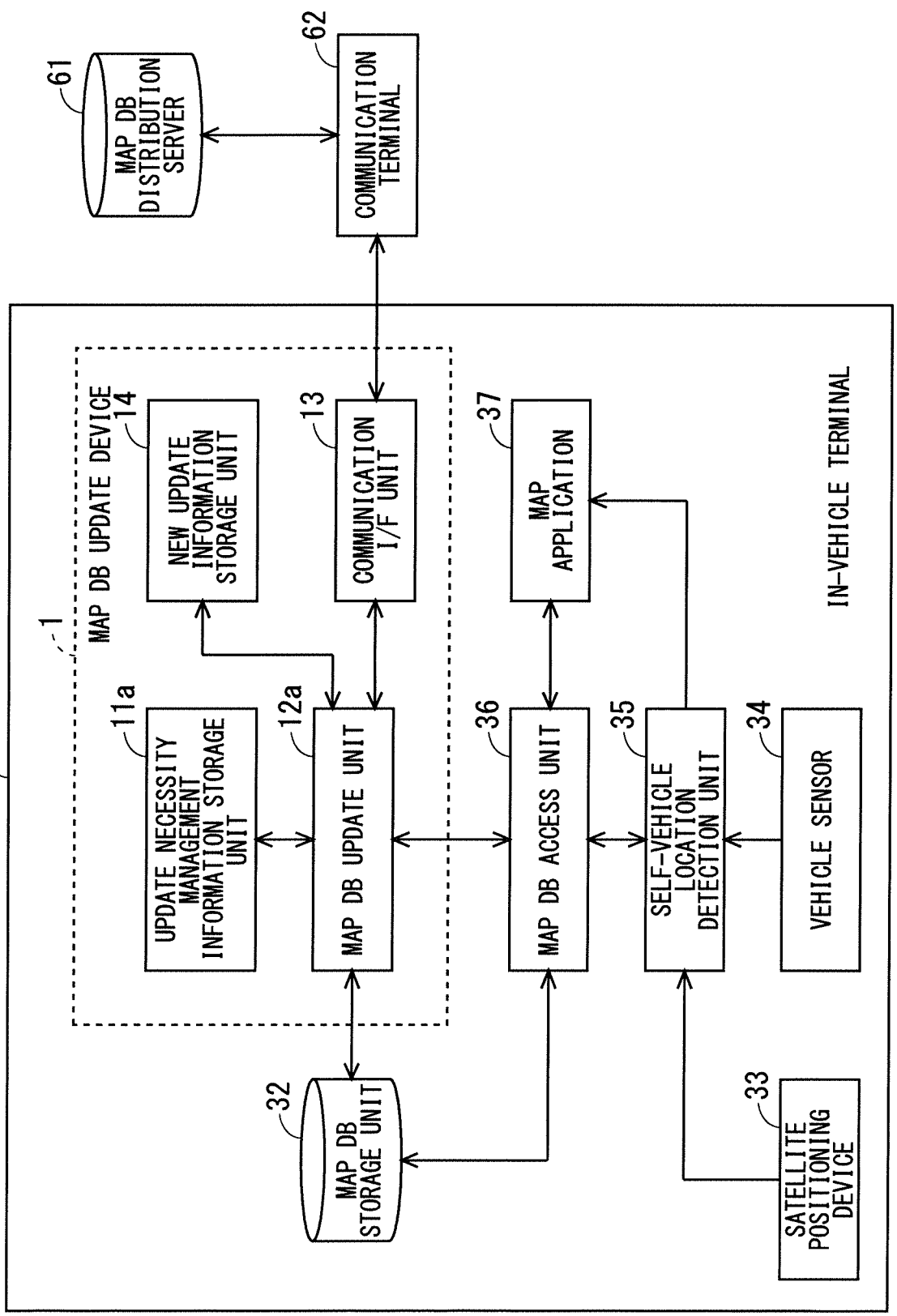
FIG. 3 is a block diagram showing a configuration of an in-vehicle terminal in accordance with a second preferred embodiment.

FIG. 1 is a block diagram showing a configuration of a map DB update device 1 which is a map data update apparatus in accordance with the first preferred embodiment.

The map DB update device 1 can be moved together with a vehicle by, for example, being equipped on the vehicle or being carried into the vehicle. In the following description, the vehicle which can be moved together with the map DB update device 1, to which attention is paid, will be referred to as a "self-vehicle".

In the self-vehicle or the map DB update device 1, a map DB which is map data is stored. This map DB is divided into a plurality of meshes and each of a plurality of mesh files corresponds to one or more meshes. In other words, one mesh file corresponds to part of the map DB. Further, though one mesh file corresponds to a range of one rectangular mesh in the following description, one mesh file may correspond to a range of a plurality of rectangular meshes.

In a map DB distribution server 61 serving as a server, the mesh file of the map DB is updated as appropriate, and in response to a request from the map DB update device 1, the updated mesh file is distributed from the map DB distribution server 61 to the map DB update device 1. The map DB update device 1 performs communication with the map DB distribution server 61, to thereby selectively update the plurality of mesh files. Herein, "selectively updating of the plurality of mesh files" corresponds to updating of one or more of the plurality of mesh files.

The map DB update device 1 shown in FIG. 1 includes a storage unit 11 and an update unit 12. The storage unit 11 stores an update necessity management file.

Figure 2:
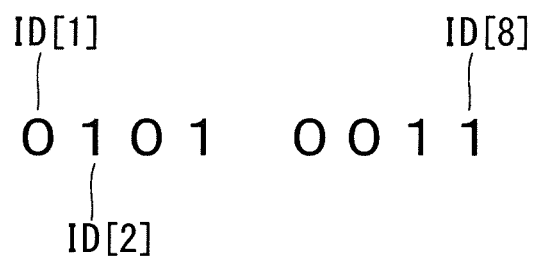

FIG. 2 is a view showing exemplary data of the update necessity management file. The update necessity management file has a bit array. In the bit array, respective positions of a plurality of bits are associated with respective mesh IDs for identifying the plurality of mesh files.

FIG. 2 shows an exemplary case where the map DB is divided into eight mesh files and eight mesh files are identified by mesh IDs [1] to [8], respectively. Then, the position of a bit at the leftmost end is associated with the mesh ID [1], the position of a bit next thereto on the right is associated with the mesh ID [2], . . . and the position of a bit at the rightmost end is associated with the mesh ID [8]. Further, though the position of the bit is associated with the mesh ID so that the mesh ID becomes larger from left to right of the positions of the bits in FIG. 2, this correspondence may be changed as appropriate in consideration of the efficiency of data storage of the map DB update device 1.

In the update necessity management file, an update necessity flag which is 1-bit flag information indicating the necessity of an update of the mesh file is stored at the position corresponding to the mesh ID of the mesh file in the above-described bit array. For example, assumed is a case where the update necessity flag having a 1-bit value of "1" indicates "update-needed" and the update necessity flag having a 1-bit value of "0" indicates "update-unneeded". In this case, in FIG. 2, since the update necessity flag having a value of "0" is stored at the position corresponding to the mesh ID [1], it is shown that it is not necessary to update the mesh file with the mesh ID [1]. Further, in FIG. 2, for example, since the update necessity flag having a value of "1" is stored at the position corresponding to the mesh ID [2], it is shown that it is necessary to update the mesh file with the mesh ID [2].

Herein, among the plurality of mesh files, a mesh file specified as a target to be used in the self-vehicle is referred to as a "specific mesh file". The specific mesh file may be one mesh file or a plurality of mesh files. The update unit 12 of FIG. 1 updates the specific mesh file stored in the self-vehicle or the map DB update device 1 on the basis of the mesh ID of the specific mesh file and the update necessity management file.

In FIG. 2, for example, assumed is a case where the mesh files with the mesh IDs [1] to [4] are specific mesh files and the mesh files with the mesh IDs [5] to [8] are not specific mesh files. In this case, among the mesh IDs [1] to [4], the mesh IDs for which "update-needed" ("1") is set as the update necessity flag are the mesh IDs [2] and [4]. For this reason, the update unit 12 receives new mesh files with the mesh IDs [2] and [4] from the map DB distribution server 61. Then, the update unit 12 updates the specific mesh files (the mesh files with the mesh IDs [2] and [4]) stored in the self-vehicle or the map DB update device 1 with the received mesh files.

Further, the update unit 12 updates the update necessity management file on the basis of an update result of the specific mesh file and received information received from the map DB distribution server 61.

In a case, for example, where such an update as shown in the above exemplary case is performed on the update necessity management file of FIG. 2, the update unit 12 updates the update necessity flags for the mesh IDs [2] and

[4] of the update necessity management file from "update-needed" ("1") to "update-unneeded" ("0").

In a case, for example, where the received information from the map DB distribution server 61 indicates that the mesh file with the mesh ID [3] has been updated, the update unit 12 updates the update necessity flag for the mesh ID [3] of the update necessity management file of FIG. 2 from "update-unneeded" ("0") to "update-needed" ("1").

Summary of the First Preferred Embodiment

Conventionally, as a file used for managing an update of the mesh file, used is a file in which the mesh ID is associated with a version of the mesh file. When the number of mesh files increases or the number of versions increases, however, there arises a problem that the mesh ID number and the number of versions increase and the data size of the above-described file increases.

On the other hand, the map DB update device 1 in accordance with the present first preferred embodiment uses the update necessity management file having a bit array in which respective positions of a plurality of bits are associated with respective mesh IDs of a plurality of mesh files, in which 1-bit flag information indicating the necessity of an update of the mesh file is stored at the position corresponding to the mesh ID of the mesh file in the bit array. With such a configuration, it is possible to reduce the data size of the file used for managing an update of the mesh file, and it is thereby possible to shorten the time required to open/close the update necessity management file and achieve reduction in the arithmetic operation time. As a result, it is possible to increase the real-time property of the update of the mesh file.

Further, conventionally, when some mesh files are updated in the map DB distribution server 61, all the some mesh files are updated also in the vehicle. There arises a problem, however, that such an update requires relatively large consumption of the CPU (Central Processing Unit) resource and the memory resource of the vehicle.

On the other hand, in the present first preferred embodiment, among the mesh files updated by the map DB distribution server 61, the specific mesh file which is a mesh file specified as a target to be used in the self-vehicle is updated on the basis of the update necessity management file. Since an update of the mesh file which is less needed is thereby suppressed, it is possible to reduce the consumption of the CPU resource and the memory resource of the self-vehicle. As a result, it is possible to increase the real-time property of the update of the mesh file.

The Second Preferred Embodiment

FIG. 3 is a block diagram showing a configuration of an in-vehicle terminal 31a including the map DB update device 1 which is the map data update device, and the like in accordance with the second preferred embodiment. Hereinafter, among constituent elements in accordance with the second preferred embodiment, the constituent elements identical to or similar to those described above will be represented by the same or similar reference signs, and different constituent elements will be mainly described.

The in-vehicle terminal 31a performs communication with the map DB distribution server 61 through a communication terminal 62. The map DB distribution server 61 is the same as that in the first preferred embodiment. The map DB distribution server 61 of the second preferred embodiment, however, manages a version management file described later.

The in-vehicle terminal 31a uses the map DB, and the map DB is updated by the map DB update device 1 as appropriate. The in-vehicle terminal 31a shown in FIG. 3 includes a map DB storage unit 32 which is a map data storage unit, a satellite positioning device 33, a vehicle sensor 34, a self-vehicle location detection unit 35 which is a vehicle location detection unit, a map DB access unit 36 which is a map data access unit, and a map application 37, as well as the map DB update device 1.

The map DB storage unit 32 stores a plurality of mesh files with respect to the map DB which is map data. Though one mesh file corresponds to a range of one rectangular mesh in the present second preferred embodiment, this is only one exemplary case.

In the present second preferred embodiment, the map DB of the map DB storage unit 32 includes, for example, a normal accuracy map DB which is normal accuracy map data and a high accuracy map DB which is high accuracy map data, which has an accuracy higher than that of the normal accuracy map DB. The normal accuracy map DB which is a map DB including, for example, a road shape of a road centerline with an error on a several-meter level. The high accuracy map DB which is a map DB including, for example, a lane shape of a lane centerline with an error on a several-centimeter level.

The satellite positioning device 33 is, for example, a GNSS (Global Navigation Satellite System) receiver such as a GPS (Global Positioning System) receiver, and acquires positioning data indicating a position (location) of the self-vehicle, which is measured by a satellite.

The vehicle sensor 34 detects sensor information of the self-vehicle, such as a vehicle speed pulse of the self-vehicle, acceleration of the self-vehicle, or the like. The vehicle sensor 34 may include a device for detecting the conditions of the surroundings of the self-vehicle.

The self-vehicle location detection unit 35 detects a location (position) of the self-vehicle on the basis of the positioning data acquired by the satellite positioning device 33 and the sensor information detected by the vehicle sensor 34. Further, the self-vehicle location detection unit 35 may perform map matching of the location of the self-vehicle on the basis of the road shape included in the map DB of the map DB storage unit 32.

The map DB access unit 36 specifies a mesh file requested by the map application 37, among the plurality of mesh files stored in the map DB storage unit 32, as the specific mesh file described in the first preferred embodiment. Then, the map DB access unit 36 outputs a map update request of the specific mesh file to a map DB update unit 12a of the map DB update device 1. Receiving the map update request, the map DB update unit 12a performs processing for updating the specific mesh file as appropriate. Further, by the processing of the map DB update unit 12a, the specific mesh file in the map DB storage unit 32 is sometimes updated and sometimes not. The map DB access unit 36 reads the specific mesh file after being processed out from the map DB storage unit 32 and outputs the file to the map application 37.

The map application 37 is an application using the mesh file of the map DB, and requests the map DB access unit 36 to output the mesh file on the basis of the location of the self-vehicle, which is detected by the self-vehicle location detection unit 35. As the map application 37, used is, for example, a navigation application, an ADAS application, an AD application, or the like.

<Map DB Update Device>

The map DB update device 1 shown in FIG. 3 includes an update necessity management information storage unit 11a, the map DB update unit 12a, a communication I/F (interface) unit 13, and anew update information storage unit 14. The update necessity management information storage unit 11a of FIG. 3 is included in the concept of the storage unit 11 of FIG. 1, and the map DB update unit 12a of FIG. 3 is included in the concept of the update unit 12 of FIG. 1.

The update necessity management information storage unit 11a stores an update necessity management file which is the same as the update necessity management file described in the first preferred embodiment.

When the map DB update unit 12a receives the map update request of the specific mesh file from the map DB access unit 36, the map DB update unit 12a determines whether to update the specific mesh file in the map DB storage unit 32 on the basis of the mesh ID of the specific mesh file and the update necessity management file. When the map DB update unit 12a determines to update the specific mesh file, the map DB update unit 12a receives a new mesh file which corresponds to the specific mesh file from the map DB distribution server 61 through the communication I/F unit 13. Then, the map DB update unit 12a updates the specific mesh file in the map DB storage unit 32 with the received mesh file. Further, the map DB update unit 12a updates the update necessity management file on the basis of the update result of the specific mesh file and the received information received from the map DB distribution server 61 through the communication I/F unit 13.

The communication I/F unit 13 controls communication of the communication terminal 62 to perform communication with the map DB distribution server 61. Hereinafter, "transmission and reception to/from the map DB distribution server 61 through the communication I/F unit 13 by any constituent element of the map DB update device 1" will be sometimes abbreviated as "transmission and reception to/from the map DB distribution server 61 by the constituent element".

The new update information storage unit 14 stores the update file received from the map DB distribution server 61 as appropriate. The received information in accordance with the present second preferred embodiment is the update file, and this update file is generated on the basis of the version management file managed by the map DB distribution server 61.

<Version Management File>

FIGS. 4A to 4D are views showing mesh areas, the mesh files, and the version management file in accordance with the second preferred embodiment.

An area in a map indicated by the map DB is divided by a specific rectangle referred to as a mesh (parcel) into a plurality of mesh areas. In the exemplary case of FIG. 4A, the area of the map indicated by the map DB is divided into 5×7 mesh areas. To each of the plurality of mesh areas, given is a mesh ID used for identifying the mesh area. In the exemplary case of FIG. 4B, as the mesh ID, "01" is given to a lower-left mesh area. Then, (i) as the mesh area proceeds toward right by 1, 1 is added to the mesh ID number, and (ii) a number next to the mesh ID number of the mesh area at the right end in the row is given to a mesh area at the left end immediately above the row. This assignment rule of the mesh ID, however, is not limited to this but any other assignment rule may be used.

A partial map DB including a road link and anode in each mesh area is stored into the mesh file shown in FIG. 4B. Further, among the mesh files (m=1 to M) (vn) shown in FIG. 4B, m represents a mesh ID of the mesh file and n represents a version of the map DB. In a case of FIG. 4A, M=35, and thirty-five mesh files are used.

The versions of the plurality of mesh files are managed by the version management file. Further, in the version management file (vn) of FIG. 4B, n represents a version of the map DB.

FIG. 4C is a view showing the version management file in accordance with the second preferred embodiment. To a file name of the version management file, for example, given is a name (Ver. n, n≥3 in the exemplary case of FIG. 4C) by which the version of the version management file is recognized.

At an address of "0000", the version ("Ver. 3" in the exemplary case of FIG. 4C) of the map DB in a case where the mesh file with the mesh ID [01] is updated is stored as the version of the mesh file. At an address of "0001", the version ("Ver. 2" in the exemplary case of FIG. 4C) of the map DB in a case where the mesh file with the mesh ID [02] is updated is stored as the version of the mesh file. The version of the mesh file is stored similarly at the following addresses.

Generally, even when a version upgrade of the map DB occurs, all the mesh files are not necessarily updated, and in most cases, some mesh files are updated and the other mesh files are not updated. For this reason, as shown in FIG. 4C, respective versions of the plurality of mesh files are often different from one another. Further, the version of the mesh file is the same as or smaller than that of the map DB. On the other hand, since the version of the version management file is updated when any one of the plurality of mesh files is updated, the version of the version management file is substantially the same as the version of the map DB.

When the version of the map DB is Ver. 1, as shown in FIG. 4D, the versions of all the mesh files in the version management file are all Ver. 1. Since the version management file as shown in FIG. 4D is not substantially used in the present second preferred embodiment, the version management file in which the version is Ver. 1 may not be set.

FIG. 5 is a view showing various files stored in the in-vehicle terminal 31a and the map DB distribution server 61 when the map DB is updated n times, in other words, the version of the map DB is Ver. n.

The map DB distribution server 61 stores M×n mesh files having versions from 1 to n, and stores n version management files having versions from 1 to n.

The in-vehicle terminal 31a stores M mesh files having versions not larger than n, and stores one update necessity management file. Further, even when the mesh file with one mesh ID in the map DB distribution server 61 is updated, the mesh file with the same mesh ID in the in-vehicle terminal 31a is not updated unless requested by the map application 37. For this reason, the version of the mesh file in the in-vehicle terminal 31a and the version of the mesh file in the map DB distribution server 61 are sometimes the same as each other and sometimes different from each other even when these mesh files have the same mesh ID. In other words, the version of the mesh file in the in-vehicle terminal 31a is independent to some degree of the version of the mesh file in the map DB distribution server 61.

The map DB distribution server 61 generates an update file on the basis of a difference between the version management file (map DB) of the latest version (the first version) and the version management file (map DB) of a version immediately before the latest version (the second version). The update file is a file having the same data format as that of the update necessity management file, and the necessity of an update of the mesh file for each mesh ID is set.

For example, assumed is a case where an update is performed from the version management file of the (n−1)

version to the version management file of the n version and the latest version is n version. In this case, with respect to the mesh file necessary to be updated in the in-vehicle terminal 31a as the version management file is updated, the map DB distribution server 61 generates an update file used for setting the update necessity flag of the mesh ID of the update necessity management file to "update-needed". On the other hand, with respect to the mesh file unnecessary to be updated in the in-vehicle terminal 31a as the version management file is updated, the map DB distribution server 61 generates an update file used for setting the update necessity flag of the mesh ID of the update necessity management file to "update-unneeded".

Further, in the present second preferred embodiment, the update necessity flag having a value of "1" indicates that the specific mesh file with the corresponding mesh ID needs to be updated and the update necessity flag having a value of "0" indicates that the specific mesh file with the corresponding mesh ID does not need to be updated.

<Operation>

Figure 6:
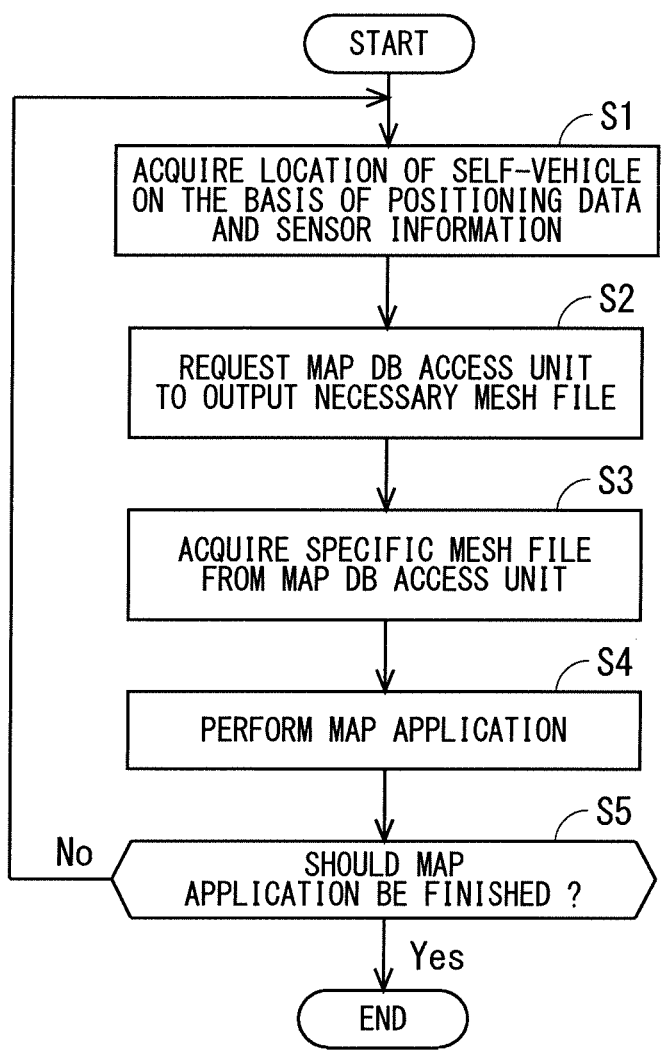
FIG. 6 is a flowchart showing an operation of the in-vehicle terminal in accordance with the second preferred embodiment.
Figure 7:
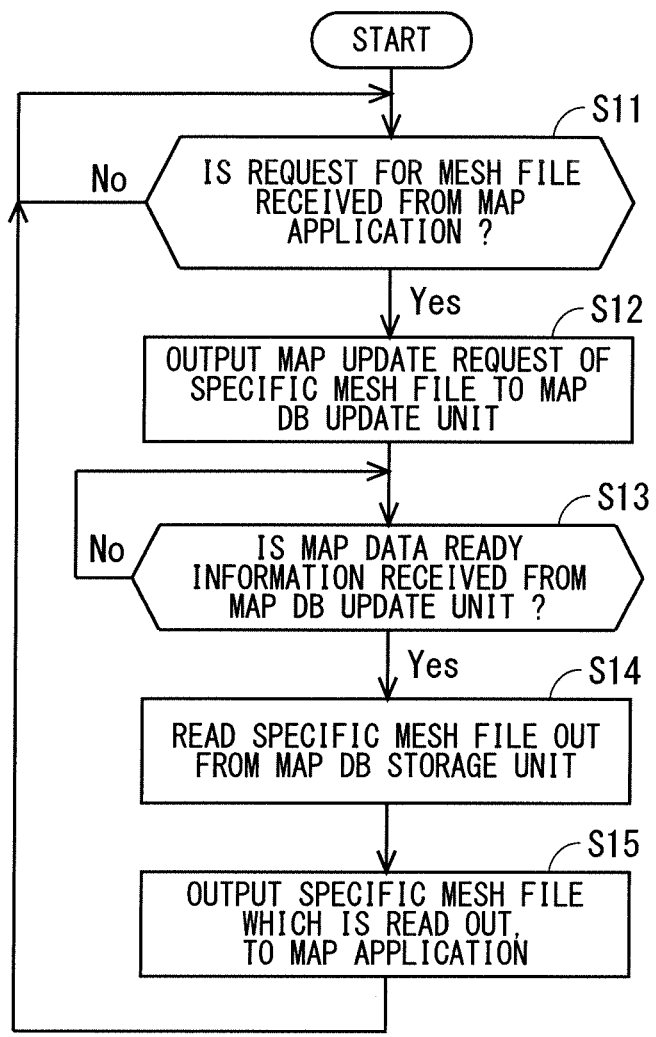
FIG. 7 is a flowchart showing the operation of the in-vehicle terminal in accordance with the second preferred embodiment.
Figure 8:
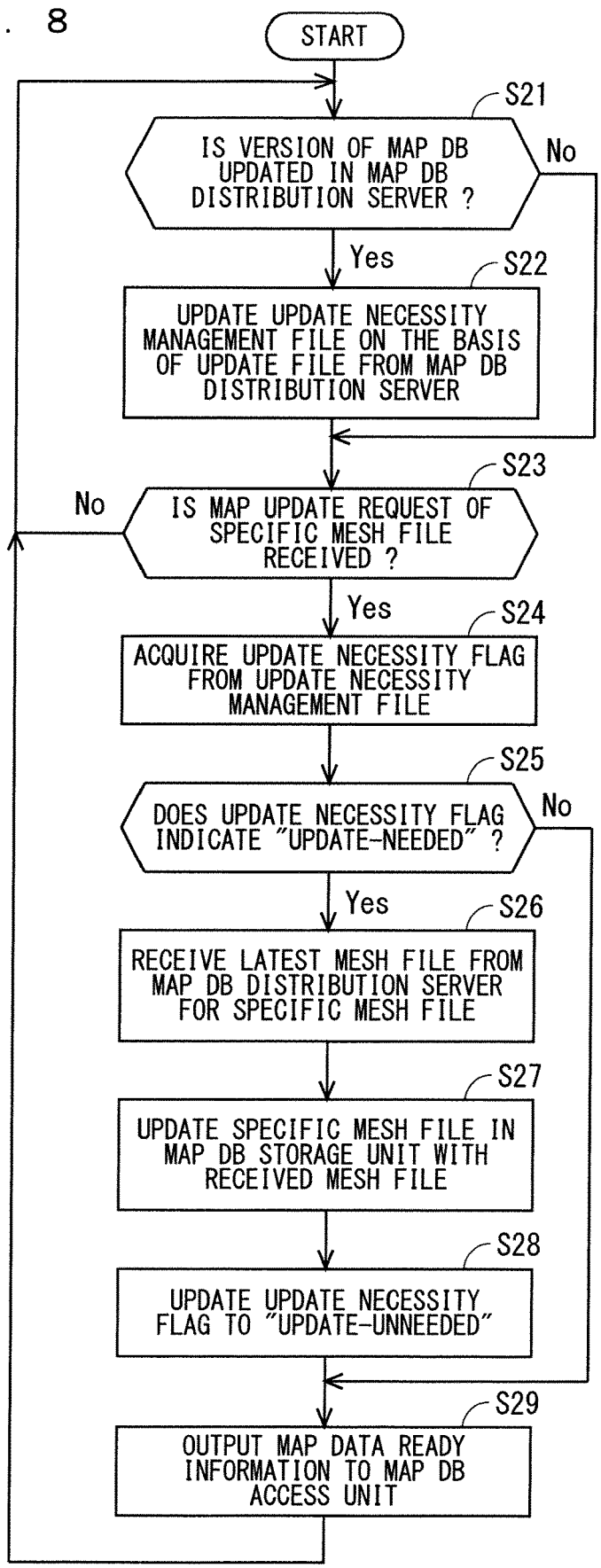
FIG. 8 is a flowchart showing the operation of the in-vehicle terminal in accordance with the second preferred embodiment.

FIGS. 6 to 8 are flowcharts each showing an operation of the in-vehicle terminal 31a in accordance with the second preferred embodiment.

With reference to FIG. 6, first, an operation performed mainly by the map application 37 will be described.

When the map application 37 starts up, in Step S1, the self-vehicle location detection unit 35 detects a location of the self-vehicle on the basis of the positioning data acquired by the satellite positioning device 33 and the sensor information detected by the vehicle sensor 34. Further, the self-vehicle location detection unit 35 may perform map matching of the location of the self-vehicle on the basis of the road shape included in the map DB of the map DB storage unit 32. The map application 37 acquires the location of the self-vehicle, which is detected by the self-vehicle location detection unit 35.

In Step S2, the map application 37 requests the map DB access unit 36 to output the mesh file required by the map application 37 on the basis of the location of the self-vehicle, which is detected by the self-vehicle location detection unit 35.

The map DB access unit 36 thereby specifies the mesh file requested from the map application 37, as the specific mesh file, and outputs a map update request of the specific mesh file to the map DB update unit 12a. Receiving the map update request, the map DB update unit 12a updates the specific mesh file in the map DB storage unit 32 as appropriate. The map DB access unit 36 reads the specific mesh file after being processed, out from the map DB storage unit 32.

In Step S3, the map application 37 acquires the specific mesh file read out from the map DB storage unit 32 by the map DB access unit 36.

In Step S4, the map application 37 performs a navigation function, an ADAS function (driver assistance function), an AD function (autonomous driving function), or the like by using the specific mesh file acquired from the map DB access unit 36.

In Step S5, the in-vehicle terminal 31a determines whether to finish the map application 37, for example, on the basis of whether or not there is a stop of a driving source (e.g., at least one of an engine and a motor) of the self-vehicle or an end instruction for the map application 37. When it is determined to finish the map application 37, the operation of FIG. 6 is ended, and when it is not determined to finish the map application 37, the process goes back to Step S1.

Next, with reference to FIG. 7, an operation performed mainly by the map DB access unit 36 will be described.

In Step S11, the map DB access unit 36 determines whether or not a request for the mesh file is received from the map application 37. When it is determined that the request is received, the process goes to Step S12, and when it is not determined that the request is received, the operation of Step S11 is repeated.

In Step S12, the map DB access unit 36 specifies the mesh file requested from the map application 37 as the specific mesh file and outputs the map update request of the specific mesh file to the map DB update unit 12a. An output of the map update request corresponds to an inquiry on whether or not the specific mesh file is updated to the latest one.

In Step S13, the map DB access unit 36 determines whether or not map data ready information is received from the map DB update unit 12a. Further, the map data ready information is information to be outputted from the map DB update unit 12a to the map DB access unit 36 after the map DB update unit 12a receiving the map update request performs an operation for updating the specific mesh file as appropriate. When it is determined that the map data ready information is received, the process goes to Step S14, and when it is not determined that the map data ready information is received, the operation of Step S13 is repeated.

In Step S14, the map DB access unit 36 reads the specific mesh file out from the map DB storage unit 32.

In Step S15, the map DB access unit 36 outputs the specific mesh file which is read out, to the map application 37. After that, the process goes back to Step S11.

Next, with reference to FIG. 8, an operation performed mainly by the map DB update unit 12a of the map DB update device 1 will be described.

In Step S21, the map DB update unit 12a checks whether or not the version of the map DB is updated in the map DB distribution server 61. As a checking method, the map DB update unit 12a may regularly or irregularly make an inquiry to the map DB distribution server 61 or the map DB distribution server 61 may regularly or irregularly make a notification to the map DB update unit 12a.

When it is confirmed that the version is updated, the process goes to Step S22, and when it is not confirmed that the version is updated, the process goes to Step S23.

In Step S22, the map DB update unit 12a receives an update file generated on the basis of the version management file, from the map DB distribution server 61, and updates the update necessity management file on the basis of the update file. In any one mesh file in the update necessity management file, the update necessity flag corresponding to the mesh ID is thereby updated to "update-needed". Further, an update of the update necessity management file will be described in detail later. After that, the process goes to Step S23.

In Step S23, the map DB update unit 12a determines whether or not the map update request of the specific mesh file is received from the map DB access unit 36. When it is determined that the map update request is received, the process goes to Step S24, and when it is not determined that the map update request is received, the process goes back to Step S21.

In Step S24, the map DB update unit 12a acquires the update necessity flag of the position corresponding to the mesh ID of the specific mesh file in the bit array of the update necessity management file.

In Step S25, the map DB update unit 12a determines whether or not the update necessity flag indicates "update-needed". When it is determined that the update necessity flag indicates "update-needed", the process goes to Step S26, and when it is determined that the update necessity flag does not indicate "update-needed" (indicates "update-unneeded"), the process goes to Step S29.

In Step S26, with respect to the specific mesh file on which the update necessity flag indicates "update-needed", the map DB update unit 12a requests the map DB distribution server 61 to output a new mesh file and receives the new mesh file from the map DB distribution server 61.

In Step S27, the map DB update unit 12a overwrites the specific mesh file in the map DB storage unit 32 with the received mesh file. Among the plurality of mesh files in the map DB storage unit 32, the specific mesh file on which the update necessity flag of the update necessity management file indicates "update-needed" is thereby updated.

In Step S28, the map DB update unit 12a updates the update necessity flag of the specific mesh file, which is updated in Step S27, from "update-needed ("1")" to "update-unneeded ("0")" in the update necessity management file. Since the update necessity flag updated to "update-unneeded ("0")" maintains "update-unneeded" until the update necessity flag is updated to "update-needed" in Step S22, the operations in Steps S26 to S28 on the update necessity flag are not performed.

In Step S29, the map DB update unit 12a outputs the map data ready information to the map DB access unit 36. After that, the process goes back to Step S21. Further, though not shown, the operations in FIGS. 6 to 8 are ended by power-off or the like.

<Exemplary Operation>

FIGS. 9A to 9F and 10A to 10E are parts of flowcharts each showing an exemplary operation of the in-vehicle terminal 31a in accordance with the second preferred embodiment.

Further, in this exemplary operation, the map DB storage unit 32 and the update necessity management information storage unit 11a include a memory in which power supply is secured, or a nonvolatile memory. Then, the mesh file and the update necessity management file are stored in these memories so that these files should not disappear even when the driving source (e.g., at least one of an engine and a motor) of the self-vehicle is stopped.

Herein, for simplicity, description will be made, assuming that when the latest version is Ver. 1, the in-vehicle terminal 31a in which the map DB of Ver. 1 is stored is released.

Since only the mesh file of Ver. 1 is present in the map DB distribution server 61, the version management file has such data as shown in FIG. 9A.

In this exemplary case, the update necessity management file in the in-vehicle terminal 31a in an initial state has such data as shown in FIG. 9B. Since the map DB in the in-vehicle terminal 31a is the latest version, the operations in Steps S21, S23, S24, S25, and S29 are sequentially performed, but the operations for changing the update necessity management file in Steps S22 and S28 are not performed.

Next, it is assumed that the version of the map DB in the map DB distribution server 61 is updated to Ver. 2 and the version management file has such data as shown in FIG. 9C. Further, In the exemplary case of FIG. 9C, the mesh files with mesh IDs [01], [06], [07], and [08] are updated to Ver. 2 and the other mesh files are not updated. The new mesh files which are updated are stored into the map DB distribution server 61.

Thus, when the version of the map DB is updated to Ver. 2, the map DB distribution server 61 generates an update file (Ver. 2) as shown in FIG. 9D in response to the version upgrade of the map DB (version management file). The update file has the same data format as that of the update necessity management file, and in the update file, the mesh ID, a bit address of the mesh file, and an update flag are associated with one another. Further, the update flag having a value of "1" indicates that the mesh file with the corresponding mesh ID is updated in the map DB distribution server 61, and the update flag having a value of "0" indicates that the mesh file with the corresponding mesh ID is not updated in the map DB distribution server 61.

The update flag of the update file is set by the map DB distribution server 61 on the basis of a difference between the version management file of the latest version and the version management file of a version immediately before the latest version. Herein, the version management file of the version immediately before the latest version is the version management file shown in FIG. 9A, and the version management file of the latest version is the version management file shown in FIG. 9C. For this reason, in the version upgrade of the version management file from FIG. 9A to FIG. 9C, "1" is set as the update flag to the updated mesh file, and "0" is set as the update flag to the unupdated mesh file.

Receiving the update file shown in FIG. 9D from the map DB distribution server 61, the map DB update unit 12a of the map DB update device 1 performs the operation of Step S22 in FIG. 8. For example, the map DB update unit 12a performs a bit operation for updating the update necessity management file on the basis of the update file shown in FIG. 9D and the update necessity management file shown in FIG. 9B. In the present second preferred embodiment, the map DB update unit 12a performs a bitwise OR operation as the bit operation, to thereby update the update necessity management file as shown in FIG. 9E. In the present second preferred embodiment, since the update necessity management file can be updated only by the bitwise OR operation, it is possible to update the update necessity management file at high speed.

After that, in Step S2 of FIG. 6, when the map application 37 requests the mesh file with the mesh ID [06], for example, the operations of Steps S24, S25, S26, S27, and S28 are performed. As shown in FIG. 9F, the map DB update unit 12a thereby updates the update necessity flag corresponding to the mesh ID [06](bit address=0101) of the update necessity management file from "update-needed ("1")" to "update-unneeded ("0")". Such an operation is performed in a case where the map application 37 requests the mesh file which is set to "update-needed ("1")". Usually, since whether to perform this operation differs depending on each in-vehicle terminal 31a, the content of the update necessity management file differs depending on each in-vehicle terminal 31a.

Next, assumed is that the version of the map DB of the map DB distribution server 61 is updated to Ver. 3 and the version management file has such data as shown in FIG. 10A. Further, in the exemplary case of FIG. 10A, the mesh files with the mesh IDs [01], [02], and [03] are updated to Ver. 3. On the other hand, the mesh files with the mesh IDs [04] and [05] maintain the version of Ver. 1 and the mesh files with the mesh IDs [06], [07], and [08] maintain the version of Ver. 2. The new mesh files which are updated are stored into the map DB distribution server 61.

After the version of the map DB is updated to Ver. 3, the map DB distribution server 61 generates an update file (Ver. 3) as shown in FIG. 10B in response to the version upgrade of the map DB (version management file) from FIG. 9B to FIG. 10A. In the update file shown in FIG. 10B, in the version upgrade of the version management file, "1" is set as the update flag to the updated mesh file, and "0" is set as the update flag to the unupdated mesh file. As this result, "1" is set to the update flags of the mesh IDs [01] to [03], and "0" is set to the update flags of the mesh IDs [04] to [08].

Receiving the update file shown in FIG. 10B from the map DB distribution server 61, the map DB update unit 12a of the map DB update device 1 performs the operation of Step S22 in FIG. 8. For example, the map DB update unit 12a performs a bit operation for updating the update necessity management file on the basis of the update file shown in FIG. 10B and the update necessity management file shown in FIG. 9F. In the present second preferred embodiment, the map DB update unit 12a performs a bitwise OR operation as the bit operation, to thereby update the update necessity management file as shown in FIG. 10C.

Further, at the point in time of FIG. 9F, the update necessity flag of the mesh ID [06] is "0". Since the latest version of the mesh file with the mesh ID [06] is Ver. 2 in the version management file of Ver. 3 shown in FIG. 10A, the update necessity flag of the mesh ID [06] in the update necessity management file becomes "0". Unlike in FIG. 10A, if the latest version of the mesh file with the mesh ID [06] is Ver. 3 in the version management file of Ver. 3, the update necessity flag of the mesh ID [06] of the update necessity management file becomes "1".

After that, in Step S2 of FIG. 6, when the map application 37 requests the mesh file with the mesh ID [03], for example, the operations of Steps S24, S25, S26, S27, and S28 are performed. As shown in FIG. 10D, the map DB update unit 12a thereby updates the update necessity flag corresponding to the mesh ID [03](bit address=0010) of the update necessity management file from "update-needed ("1")" to "update-unneeded ("0")". Such an operation is performed in a case where the map application 37 requests the mesh file which is set to "update-needed ("1")". Usually, since whether to perform this operation differs depending on each in-vehicle terminal 31a, the content of the update necessity management file differs depending on each in-vehicle terminal 31a.

FIG. 10E is a view showing the version of each mesh file in the in-vehicle terminal 31a when the update necessity management file shown in FIG. 10D is obtained. The information of FIG. 10E may be stored into the in-vehicle terminal 31a as appropriate. In a case where the in-vehicle terminal 31a has a surplus of CPU resource, when an operation for storing the information of FIG. 10E indicating a version status is performed, it is possible to suppress reduction in the real-time property of the update of the mesh file by performing the storing operation.

Figure 11:
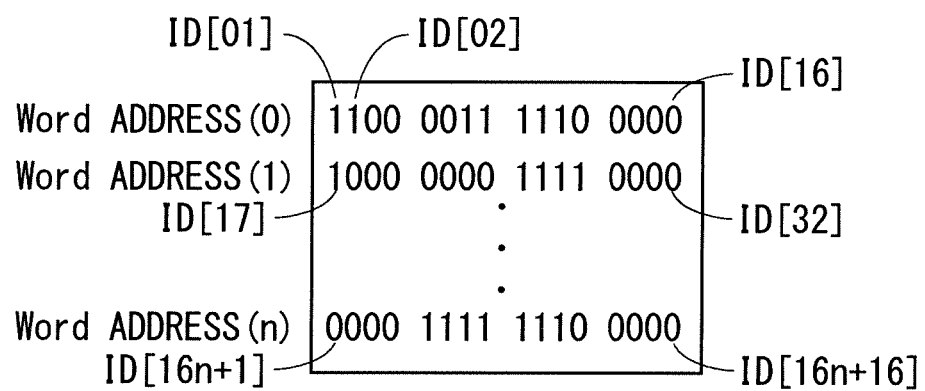
FIG. 11 is a view showing exemplary data of an update necessity management file in accordance with the second preferred embodiment.

FIG. 11 is a view showing exemplary data of the update necessity management file in accordance with the second preferred embodiment in a case where the number of meshes is relatively large. As shown in FIG. 11, the mesh IDs [01] to [16] are stored in 16-bit WORD data at the WORD address (0), and the mesh IDs [17] to [32] are stored in 16-bit WORD data at the WORD address (1).

Summary of the Second Preferred Embodiment

Thus, according to the present second preferred embodiment, like in the first preferred embodiment, since the mesh file is updated by using the update necessity management file, it is possible to increase the real-time property of the update of the mesh file.

Further, in the present second preferred embodiment, since the bit operation for updating the update necessity management file on the basis of the update file and the update necessity management file, it is possible to update the update necessity management file at high speed.

Variation 1 of the Second Preferred Embodiment

Though the map DB distribution server 61 generates the update file as shown in FIG. 9D and FIG. 10B and transmits (distributes) the update file to the in-vehicle terminal 31a when the version of the map DB in the map DB distribution server 61 is updated in the second preferred embodiment, this is only one exemplary case.

For example, there may be a case where the map DB distribution server 61 transmits (distributes) the version management file as shown in FIG. 9B and FIG. 10A and the map DB update unit 12a generates the update file on the basis of the version management file. Specifically, the map DB update unit 12a may generate the update file on the basis of a difference between the version management file of the version (the first version) received newly from the map DB distribution server 61 and the version management file of the version (the second version) immediately before the above version. Then, the map DB update unit 12a may perform the bit operation for updating the update necessity management file on the basis of the update file and the update necessity management file.

Variation 2 of the Second Preferred Embodiment

In the exemplary operation shown in FIGS. 9A to 9F and 10A to 10E of the second preferred embodiment, description has been made, assuming that when the in-vehicle terminal 31a is released, the version of the map DB in the in-vehicle terminal 31a is the same as that of the map DB in the map DB distribution server 61. In a case where there is a delay between the timing of storing the map DB in the in-vehicle terminal 31a and the timing of releasing the in-vehicle terminal 31a, however, there is a possibility that a difference between the version of map DB in the map DB distribution server 61 and that of the map DB stored in the in-vehicle terminal 31a is large.

Then, in the present variation 2, the map DB of the latest version at the release timing is stored in the in-vehicle terminal 31a. Then, in Step S22 of FIG. 8 while the in-vehicle terminal 31a operates, the map DB update unit 12a compares the latest version (Ver. nb) of the map DB acquired from the map DB distribution server 61 with the version (Ver. na) of the map DB in the in-vehicle terminal 31a.

Then, in order to update the update necessity management file of the map DB of Ver. na, the map DB update unit 12a requests the map DB distribution server 61 to output the update files from Ver. na+1 to Ver. nb and performs the bit operation, to thereby update the update necessity management file. Further, the map DB update unit 12a may first perform the bit operation among the plurality of update files and then perform the bit operation of the operation result and the update necessity management file. Alternatively, like in a case of performing the bit operation of the update necessity management file of the map DB of Ver. na and the update file of Ver. na+1 and then performing the bit operation of the update necessity management file which is thereby obtained and the update file of Ver. na+2, . . . , the map DB update unit 12a may perform the bit operation of the update necessity management file and the update file in the order of the version of the update file, Variation 3 of the Second Preferred Embodiment Though the update necessity flag having a value of "1" indicates "update-needed" and the update necessity flag having a value of "0" indicates "update-unneeded" in the update necessity management file in the second preferred embodiment, "0" and "1" may be reversed.

Specifically, in the update necessity management file, the update necessity flag having a value of "0" may indicate "update-needed" and the update necessity flag having a value of "1" may indicate "update-unneeded". In this case, when the map DB update unit 12a performs a bitwise AND operation, instead of the bitwise OR operation, as the bit operation, the same operation as that in the second preferred embodiment can be achieved.

Variation 4 of the Second Preferred Embodiment

Though description has been made in the second preferred embodiment, assuming that the update necessity management information storage unit 11a includes a nonvolatile memory and the update necessity management file and the like are stored in the nonvolatile memory, this is only one exemplary case.

In the present variation 4, in order to update the update necessity management file at high speed, the update necessity management information storage unit 11a includes a nonvolatile memory and a high-speed memory having a processing speed higher than that of the nonvolatile memory. The high-speed memory is, for example, a cache memory including an L1 cache, an L2 cache, an L3 cache, . . . incorporated in a SoC (System on Chip).

In the present variation 4, the map DB update unit 12a loads at least part of the update necessity management file stored in the nonvolatile memory into the high-speed memory as an update necessity management work file at a predetermined start timing. At least part of the update necessity management file may be the whole of the update necessity management file or may be part of the update necessity management file like in the variation 5 described later. Further, the predetermined start timing includes, for example, a timing at a start-up by a power-on of the map DB update device 1, a timing at a version upgrade of the mesh file, a timing when the load of the CPU of the map DB update device 1 is small, and the like.

The map DB update unit 12a performs an update by using the update necessity management work file, instead of the update necessity management file. Specifically, the map DB update unit 12a updates the specific mesh file in the map DB storage unit 32 on the basis of the mesh ID of the specific mesh file and the update necessity management work file. The map DB update unit 12a updates the update necessity management work file on the basis of received information such as the update file received from the map DB distribution server 61 and an update result of the specific mesh file.

The map DB update unit 12a stores the update necessity management work file into the nonvolatile memory as at least part of the update necessity management file at a predetermined end timing. The update of the update necessity management work file is thereby reflected on the update necessity management file. Further, the predetermined end timing includes, for example, a timing at a shutdown by a power-off of the map DB update device 1 and the like.

Figure 12:
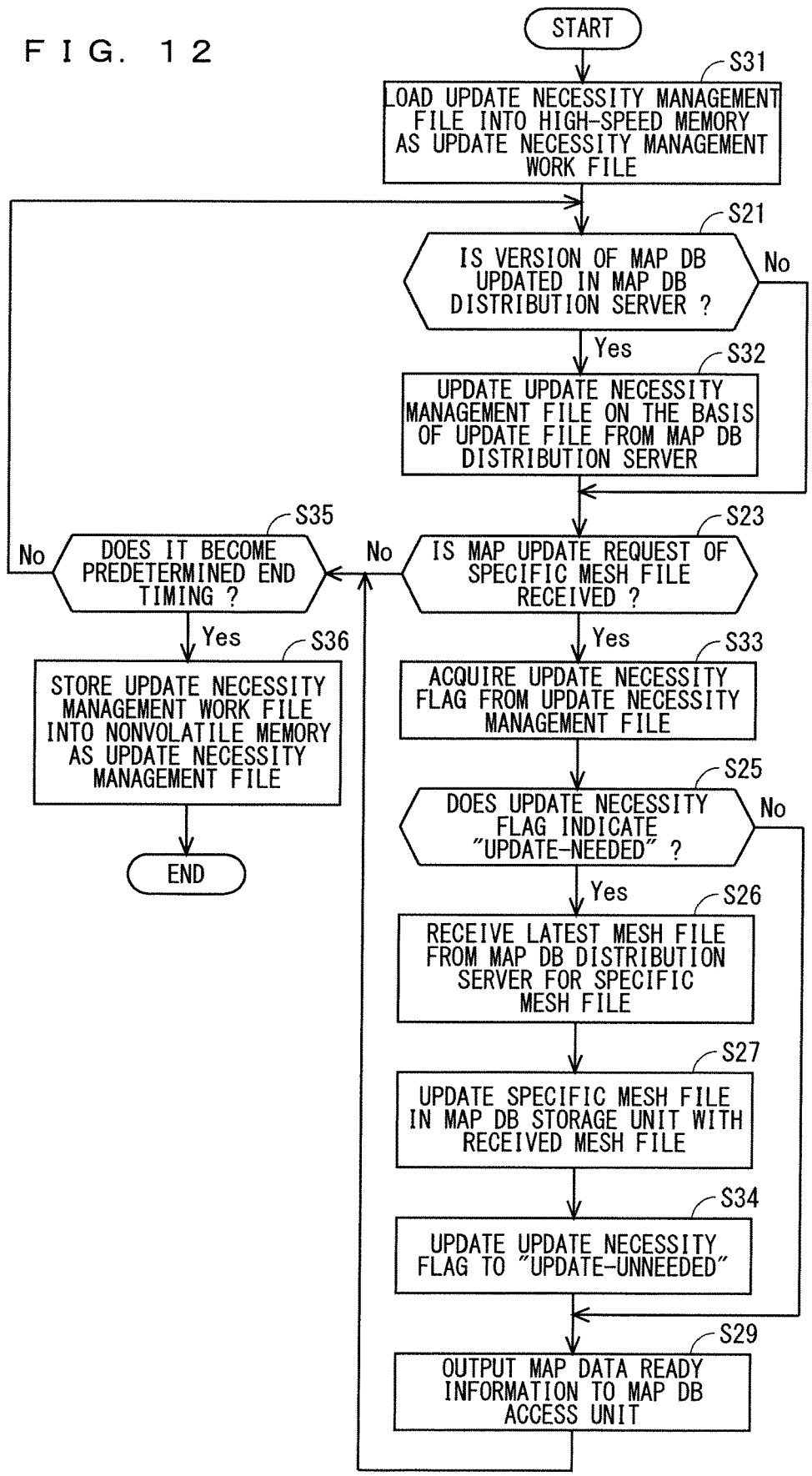
FIG. 12 is a flowchart showing an operation of the in-vehicle terminal in accordance with a variation 4 of the second preferred embodiment.

FIG. 12 is a flowchart showing an operation which is mainly performed by the map DB update unit 12a of the map DB update device 1 among the operations of the in-vehicle terminal 31a in accordance with the present variation 4. The operation of FIG. 12 is the same as the operation of FIG. 8 with Steps S31 to S36 added. The Steps S31 to S36 will be mainly described below.

In Step S31, the map DB update unit 12a loads at least part of the update necessity management file stored in the nonvolatile memory of the update necessity management information storage unit 11a into the high-speed memory of the update necessity management information storage unit 11a as the update necessity management work file.

When it is confirmed in Step S21 that the version is updated, the process goes to Step S32, and when it is not confirmed in Step S21 that the version is updated, the process goes to Step S23.

In Step S32, the map DB update unit 12a performs the same operation as that of Step S22 of FIG. 8 on the update necessity management work file, instead of the update necessity management file. Since the update necessity management work file is loaded in the high-speed memory, the map DB update unit 12a can perform the operation of Step S32 at a speed higher than that of the operation of Step S22. After that, the process goes to Step S23.

When it is determined in Step S23 that the map update request is received, the process goes to Step S33, and when it is not determined that the map update request is received, the process goes to Step S35.

In Step S33, the map DB update unit 12a performs the same operation as that of Step S24 of FIG. 8 on the update necessity management work file, instead of the update necessity management file. Since the update necessity management work file is loaded in the high-speed memory, the map DB update unit 12a can perform the operation of Step S33 at a speed higher than that of the operation of Step S24.

When it is determined in Step S25 that the update necessity flag indicates "update-needed", the process goes to Step S26, and when it is determined that the update necessity flag does not indicate "update-needed", the process goes to Step S29.

After the operations of Steps S26 and S27 are performed, the operation of Step S34 is performed. In Step S34, the map DB update unit 12a performs the same operation as that of Step S28 of FIG. 8 on the update necessity management work file, instead of the update necessity management file. Since the update necessity management work file is loaded in the high-speed memory, the map DB update unit 12a can perform the operation of Step S34 at a speed higher than that of the operation of Step S28. After that, the operations of Steps S29 and S35 are performed.

In Step S35, the map DB update unit 12a determines whether or not it becomes the predetermined end timing. When it is determined that it becomes the predetermined end timing, the process goes to Step S36, and when it is not determined that it becomes the predetermined end timing, the process goes back to Step S21.

In Step S36, the map DB update unit 12a stores the update necessity management work file into the nonvolatile memory as at least part of the update necessity management file. After that, the process of FIG. 12 is ended.

According to the map DB update device 1 of the present variation 4 as described above, since the high-speed memory is used, it is possible to perform a process concerning the update necessity management file at high speed. Since the size of the update necessity management file is small, the update necessity management work file can be stored in the high-speed memory, particularly in the cache memory such as the L1 cache, the L2 cache, or the like, for which only a relatively small capacity is prepared.

Variation 5 of the Second Preferred Embodiment

In the present variation 5, loading into the high-speed memory, and the like, are performed, like in the variation 4.

In the present variation 5, however, the map DB update unit 12a loads only a sub update necessity management file which is part of the update necessity management file stored in the nonvolatile memory into the cache memory which is a high-speed memory, as the update necessity management work file. The sub update necessity management file is a partial file for managing a vehicle location mesh file which is a mesh file in which the self-vehicle is located, among the update necessity management file.

For example, assumed is a case where one enlarged mesh area is set by using a plurality of mesh files and a plurality of enlarged mesh areas cover a national map area, and the sub update necessity management file is set for each enlarged mesh area and the update necessity management file is set for the national map area. In this case, according to the present variation 5 having such a configuration as above, in accordance with a change of the enlarged mesh area in which the self-vehicle is located, due to the movement of the self-vehicle, the sub update necessity management file to be stored in the cache memory is changed. Thus, according to the present variation 5 having a configuration in which the sub update necessity management file is stored in the cache memory and the sub update necessity management file can be changed as appropriate, it is possible to increase the usage efficiency of the cache memory having a relatively small size.

Further, the sub update necessity management file is not limited to the partial file for managing the vehicle location mesh file in the update necessity management file, but may be a partial file for managing the mesh file requested by the map application 37.

Variation 6 of the Second Preferred Embodiment

As the cache memory in the SoC, which is used as the high-speed memory in the variation 4, proposed is a cache memory including the L1 cache, the L2 cache, the L3 cache, . . . in the order of high speed of the access from the CPU. As to the data size which can be stored in these cache memories, generally, a relation of L1<L2<L3< . . . is true. The present variation 6 described below has a configuration in consideration of this point.

In the present variation 6, the update necessity management work file includes a first update necessity management work file and a second update necessity management work file. The first update necessity management work file manages the vehicle location mesh file, and for example, manages 25 (=5×5) mesh files. The second update necessity management work file manages a mesh file wider than the vehicle location mesh file, in the surroundings of the vehicle location mesh file, and for example, 625 (=25×25) mesh files.

The cache memory which is a high-speed memory includes a first high-speed memory and a second high-speed memory, and the first high-speed memory has a processing speed higher than that of the second high-speed memory. For example, the first high-speed memory uses the L1 cache, and the second high-speed memory uses the L2 cache and the L3 cache. For the first high-speed memory and the second high-speed memory, however, any combination other than this may be used, and a combination with the L4 cache or the like may be used.

Into the first high-speed memory, loaded is the first update necessity management work file corresponding to the sub update necessity management file. Into the second high-speed memory, loaded is the second update necessity management work file corresponding to an update necessity management file covering the map excluding the sub update necessity management file.

According to the present variation 6 having such a configuration as described above, in a normal case where the mesh file requested by the map application 37 goes to the next, since the first high-speed memory is used, it is possible to determine the update necessity at high speed. On the other hand, in a case where the mesh file requested by the map application 37 does not go to the next and the access to the map DB is not continuous, the second high-speed memory whose speed is lower than that of the first high-speed memory but higher than that of the main memory such as the nonvolatile memory is used. For this reason, even in this case, the process concerning the update necessity management file can be performed at high speed to some degree. In a case, particularly, where the map application 37 is the ADAS application or the AD application, the requested mesh file goes in accordance with continuous movement of the self-vehicle on a travel route which is a route of the self-vehicle, and therefore the above-described effect is valid.

The Third Preferred Embodiment

Figure 13:
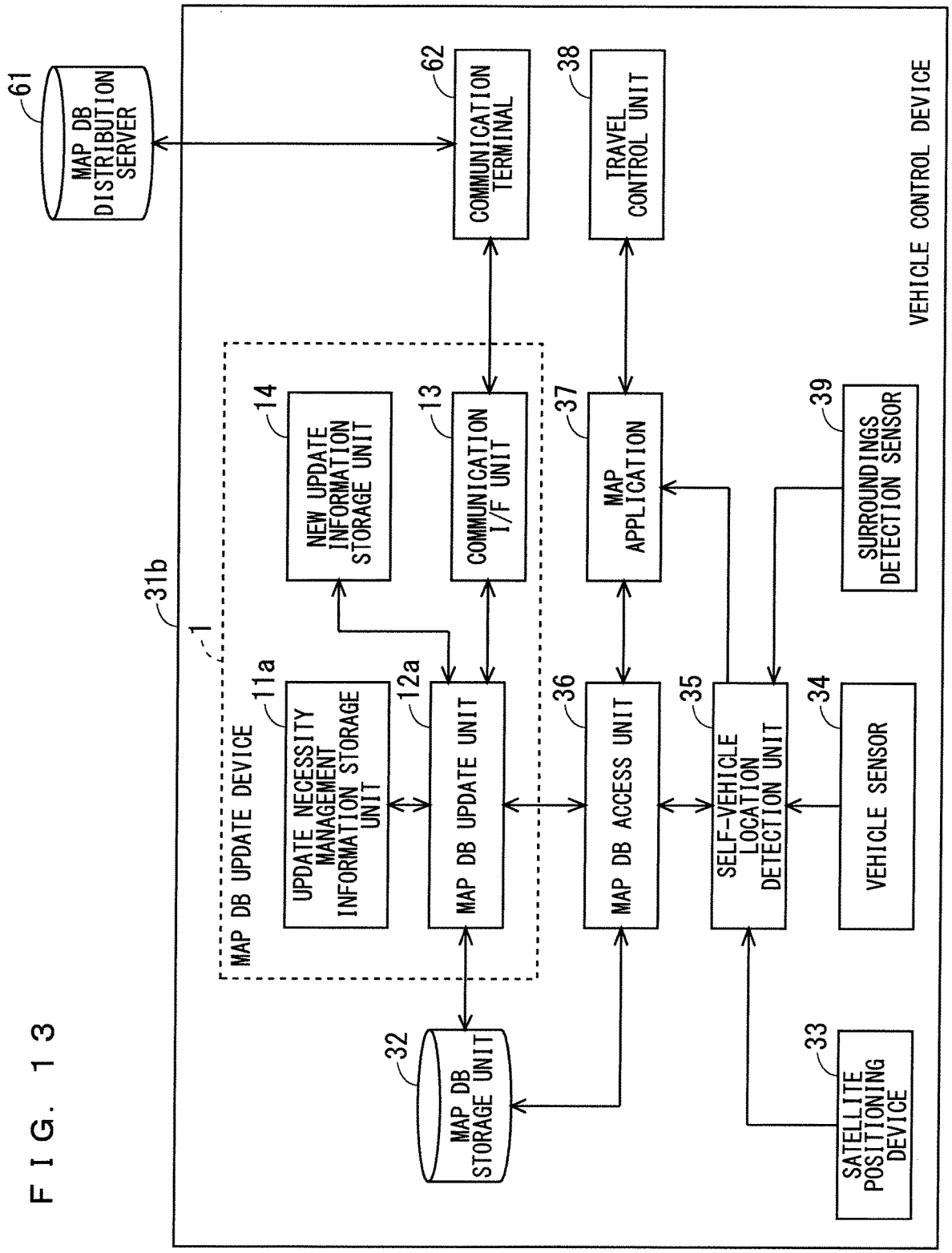
FIG. 13 is a block diagram showing a configuration of a vehicle control device in accordance with a third preferred embodiment.

FIG. 13 is a block diagram showing a configuration of a vehicle control device 31b including the map DB update device 1 which is the map data update device, and the like in accordance with the third preferred embodiment. Hereinafter, among constituent elements in accordance with the third preferred embodiment, the constituent elements identical to or similar to those described above will be represented by the same or similar reference signs, and different constituent elements will be mainly described.

The vehicle control device 31b of the present third preferred embodiment has the same configuration as that of the in-vehicle terminal 31a (FIG. 3) of the second preferred embodiment except that a travel control unit 38 and a surroundings detection sensor 39 are added.

Further, the map DB of the map DB storage unit 32 of the present third preferred embodiment includes not only the normal accuracy map DB and the high accuracy map DB described above but also a facility map DB which is facility map data used for specifying a location of the self-vehicle by using the information detected by the surroundings detection sensor 39.

FIGS. 14A to 14C are views showing mesh areas in accordance with the present third preferred embodiment. FIG. 14A shows mesh areas of the high accuracy map DB, FIG. 14B shows mesh areas of the normal accuracy map DB, and FIG. 14C shows mesh areas of the facility map DB. As shown in FIGS. 14A to 14C, in the present third preferred embodiment, respective sizes of the meshes (breaths of the mesh areas) of the normal accuracy map DB, the high accuracy map DB, and the facility map DB are the same as one another, and mesh files thereof are managed by one update necessity management file. Then, as to the meshes of the normal accuracy map DB, the high accuracy map DB, and the facility map DB, the specific mesh file and the update necessity management file are updated by one operation.

The map application 37 searches for (estimates) a travel route (route on which the self-vehicle travels) on the basis of the location of the self-vehicle which is detected by the self-vehicle location detection unit 35 on the basis of the positioning data and the sensor information and the normal accuracy map DB. For the search of the travel route, for example, used is a search function which is the same as that of a general navigation device. The map DB access unit 36 specifies at least one of a mesh file on the travel route, a mesh file in the surroundings thereof, and a mesh file in front of the travel route, as a specific mesh file, on the basis of the information on the travel route acquired from the map application 37. At that time, the information on the travel route has only to be information of any one of a link ID, a link shape, and coordinates of a branch point, or other information which can specify a mesh file corresponding to any other travel route.

Like in the second preferred embodiment, the map DB access unit 36 outputs the map update request of the specific mesh file to the map DB update unit 12a of the map DB update device 1. Receiving the map update request, the map DB update unit 12a updates the specific mesh file as appropriate. The map DB access unit 36 outputs the facility map DB after being processed by the map DB update unit 12a to the self-vehicle location detection unit 35. Further, the map DB access unit 36 outputs the high accuracy map DB after being processed by the map DB update unit 12a to the map application 37.

The surroundings detection sensor 39 which is a sensor of the vehicle detects information of the surroundings of the self-vehicle. As the surroundings detection sensor 39, for example, used is an image recognition sensor for recognizing an image of the surroundings of the self-vehicle, which is picked up by a camera, an LiDAR (light detection and ranging), or the like.

The self-vehicle location detection unit 35 detects the location of the self-vehicle which is used for controlling the travel of the self-vehicle on the basis of the facility map DB after being processed by the map DB update unit 12a and the information of the surroundings of the self-vehicle, which is detected by the surroundings detection sensor 39. For example, the self-vehicle location detection unit 35 detects the location of the self-vehicle on a lane basis by collating the shape of the facility stored in the facility map DB with an image recognition result detected by the surroundings detection sensor 39. The accuracy of the location of the self-vehicle detected thus is higher than that of the location of the self-vehicle detected on the basis of the positioning data of the satellite positioning device 33 and the sensor information of the vehicle sensor 34. Further, the location of the self-vehicle detected on the basis of the facility map DB and the information of the surroundings of the self-vehicle detected by the surroundings detection sensor 39 may be used for the search for the travel route after the detection of the location of the self-vehicle.

Hereinafter, description will be made on the configuration in which the map application 37 acquires the location of the self-vehicle detected by the self-vehicle location detection unit 35 on the basis of the facility map DB and the information of the surroundings of the self-vehicle detected by the surroundings detection sensor 39 and outputs the location of the self-vehicle to the travel control unit 38. The configuration, however, is not limited to this, but there may be a configuration where the self-vehicle location detection unit 35 directly outputs the location of the self-vehicle to the travel control unit 38.

The map application 37 outputs road information of the front of or the surroundings of the self-vehicle to the travel control unit 38, on the basis of the location of the self-vehicle from the self-vehicle location detection unit 35 and the high accuracy map DB after being processed by the map DB update unit 12a. The road information of the front of the self-vehicle includes, for example, a lane shape, position information of a signboard, and the like, and an output format may be relative coordinates with the self-vehicle as an origin point.

The travel control unit 38 controls the travel of the self-vehicle on the basis of output information from the map application 37. Specifically, the high accuracy map data after being processed by the map DB update unit 12a is indirectly used for controlling the travel of the vehicle. As the travel control unit 38, for example, used is an ADAS ECU (Electronic Control Unit), an AD ECU (Electronic Control Unit), or the like which can perform a control on a lane basis.

<Operation>

Figure 15:
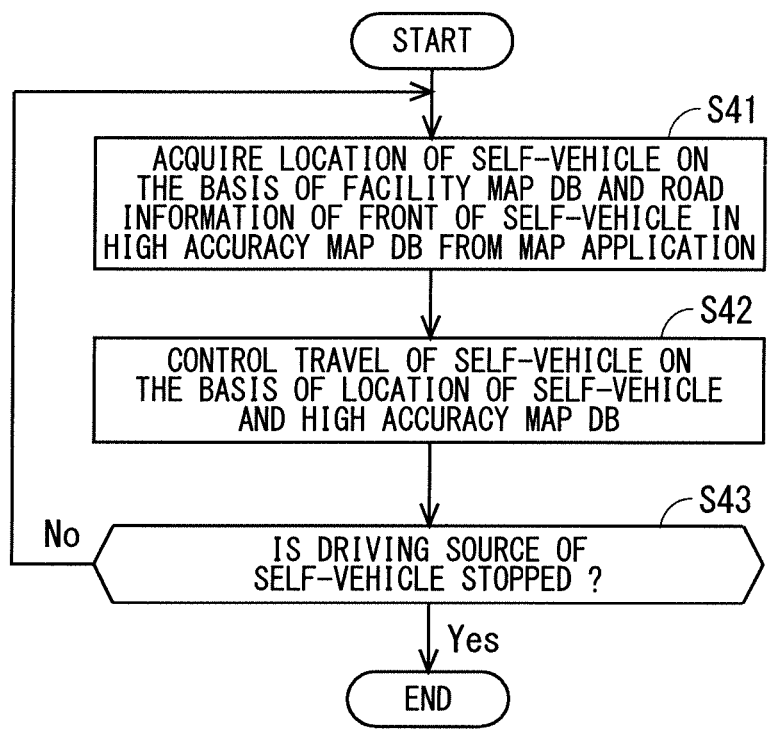
FIG. 15 is a flowchart showing an operation of the vehicle control device in accordance with the third preferred embodiment.
Figure 16:
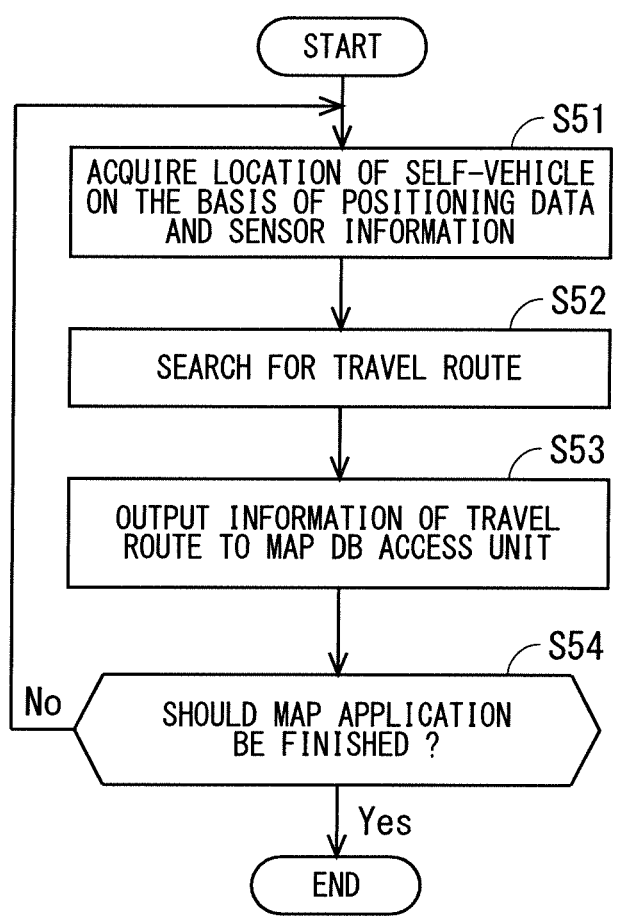
FIG. 16 is a flowchart showing the operation of the vehicle control device in accordance with the third preferred embodiment.

FIGS. 15 and 16 are flowcharts each showing an operation of the vehicle control device 31b in accordance with the present third preferred embodiment. First, with reference to FIG. 15, an operation performed mainly by the travel control unit 38 will be described.

In Step S41, the travel control unit 38 acquires the location of the self-vehicle on the basis of the facility map DB after being processed by the map application 37 and the map DB update unit 12a. Further, the travel control unit 38 acquires road information of the front of or the surroundings of the self-vehicle, which is extracted on the basis of the high accuracy map DB after being processed by the map DB update unit 12a, from the map application 37.

In Step S42, the travel control unit 38 controls the travel of the self-vehicle on the basis of the location of the self-vehicle and the road information.

In Step S43, the travel control unit 38 determines whether or not the driving source of the self-vehicle is stopped. When it is determined that the driving source is stopped, the operation of FIG. 15 is finished, and when it is not determined that the driving source is stopped, the process goes back to Step S41.

Next, with reference to FIG. 16, an operation performed mainly by the map application 37 will be described.

In Step S51, the self-vehicle location detection unit 35 detects the location of the self-vehicle on the basis of the positioning data of the satellite positioning device 33 and the sensor information of the vehicle sensor 34.

In Step S52, the map application 37 searches for the travel route on the basis of the location of the self-vehicle and the normal accuracy map DB. As the location of the self-vehicle which is used for searching for the travel route, the location of the self-vehicle detected in Step S51 may be used.

In Step S53, the map application 37 outputs the information of the travel route to the map DB access unit 36.

In Step S54, the map application 37 performs application end determination like in Step S5 (FIG. 6).

Next, with reference to FIG. 17, an operation performed mainly by the map DB access unit 36 will be described.

In Step S61, the map DB access unit 36 acquires the information of the travel route from the map application 37. Not limited to this, however, the route information may be acquired from a navigation device in a vehicle system, an external smartphone device, a server application, or the like.

In Step S62, the map DB access unit 36 selects (specifies) at least one of the mesh file of the high accuracy map DB on the travel route, the mesh file in the surroundings thereof, and the mesh file in front of the travel route, as the specific mesh file, on the basis of the information of the travel route.

In Step S63, the map DB access unit 36 outputs the map update request of the specific mesh file to the map DB update unit 12a. After that, the process goes back to Step S61. At that time, the same operations as those of Steps S13 to S15 of FIG. 7 may be performed.

Figure 17:
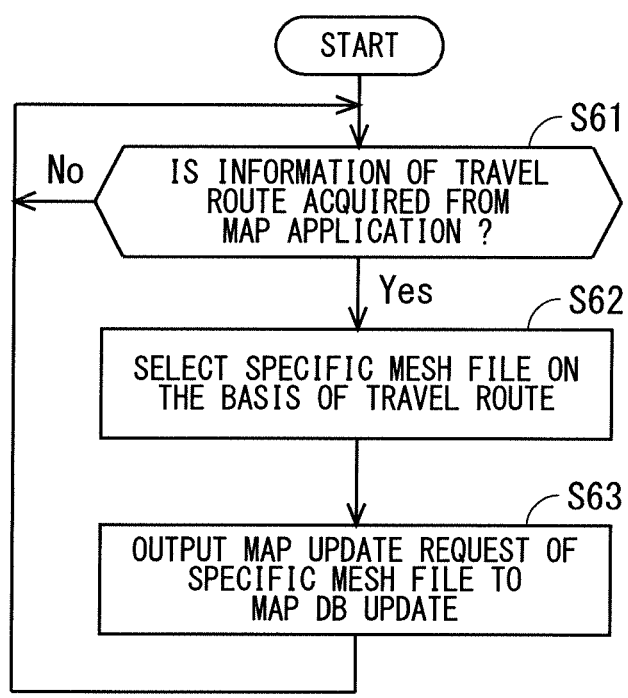
FIG. 17 is a flowchart showing the operation of the vehicle control device in accordance with the third preferred embodiment.

By performing the processing of FIG. 17 prior to the processing of FIG. 7 in the map DB access unit 36, the response from when the request of the mesh file is received from the map application 37 to outputting the specific mesh file to the map application 37 is improved.

Since the operation performed mainly by the map DB update unit 12a of the map DB update device 1 is the same as the operation (FIG. 8) of the second preferred embodiment, detailed description will be omitted. In the present third preferred embodiment, however, the operations of Steps S25 and S26 are performed on the normal accuracy map DB, the high accuracy map DB, and the facility map DB.

Summary of the Third Preferred Embodiment

According to the present third preferred embodiment as described above, the high accuracy map data after being processed by the map DB update unit 12a is used for controlling the travel of the self-vehicle, and the facility map data after being processed by the map DB update unit 12a is used for detecting the location of the self-vehicle. The data of which the real-time property of the update is increased can be used for the control of the travel of the self-vehicle, such as ADAS, AD, or the like.

Variation 1 of the Third Preferred Embodiment

In the third preferred embodiment, the mesh files of the normal accuracy map DB, the high accuracy map DB, and the facility map DB are managed by one update necessity management file. The mesh files of the normal accuracy map DB, the high accuracy map DB, and the facility map DB, however, are not always updated at the same time.

Then, by assigning three update necessity management files to the normal accuracy map DB, the high accuracy map DB, and the facility map DB, respectively, the update necessity may be individually set to the three kinds of map DBs. Then, the map DB update unit 12a may update the specific mesh file and the update necessity management file individually in all the normal accuracy map DB, the high accuracy map DB, and the facility map DB.

Further, by assigning one update necessity management file to the any two of the normal accuracy map DB, the high accuracy map DB and the facility map DB and assigning another update necessity management file to the remaining one, the update necessity for two kinds of map DBs and the update necessity for one kind of map DB may be individually set. Then, the map DB update unit 12a may update the specific mesh file and the update necessity management file individually in the two kinds of map DBs and the one kind of map DB.

Furthermore, by storing the facility map DB into the update necessity management file by the facility classification, the facility map DB having a plurality of facility classifications may be stored into a plurality of update necessity management files.

Variation 2 of the Third Preferred Embodiment

Though respective sizes of the meshes of the normal accuracy map DB, the high accuracy map DB, and the facility map DB are the same as one another as shown in FIGS. 14A to 14C in the third preferred embodiment, this is only one exemplary case. As shown in FIGS. 18A to 18C, for example, the sizes of the meshes in three of the normal accuracy map DB, the high accuracy map DB, and the facility map DB may be different from one another.

FIGS. 18A to 18C are views showing mesh areas in accordance with the present variation 2. FIG. 18A shows a mesh area of the high accuracy map DB, FIG. 18B shows a mesh area of the normal accuracy map DB, and FIG. 18C shows a mesh area of the facility map DB. Though the size of the mesh in the high accuracy map DB is smallest and that of the mesh in the facility map DB is largest in FIGS. 18A to 18C, this is only one exemplary case.

Further, the size of the mesh may be set on the basis of the data size or the update frequency of the map DB, instead of the kind of map DB. For example, as the data size becomes larger, the size of the mesh may be set to be smaller, or as the update frequency becomes higher, the size of the mesh may be set to be smaller. Furthermore, the sizes of the meshes may be different in two of the normal accuracy map DB, the high accuracy map DB, and the facility map DB, instead of three.

Variation 3 of the Third Preferred Embodiment

In the present variation 3, the update necessity management information storage unit 11a of the third preferred embodiment includes a high-speed memory like in the variation 4 of the second preferred embodiment. The high-speed memory of the variation 3, however, includes first, second, and third high-speed memories having different processing speeds. Further, the processing speed of the first high-speed memory is highest, and that of the third high-speed memory is lowest.

In the present variation 3, the update necessity management work file corresponding to the update necessity management file includes first, second, and third update necessity management work files used for the plurality of mesh files in the high accuracy map DB, the facility map DB, and the normal accuracy map DB, respectively. Then, into the first high-speed memory having the highest processing speed, the update necessity management file for managing the high accuracy map DB is loaded as the first update necessity management work file. Into the second high-speed memory, the update necessity management file for managing the facility map DB is loaded as the second update necessity management work file. Into the third high-speed memory having the lowest processing speed, the update necessity management file for managing the normal accuracy map DB is loaded as the third update necessity management work file. Then, the same process (FIG. 12) as that of the variation 4 of the second preferred embodiment is performed on the first, second, and third update necessity management work files.

According to the present variation 3, it is possible to increase the usage efficiency of the cache memory having a relatively small size.

The Fourth Preferred Embodiment

Figure 19:
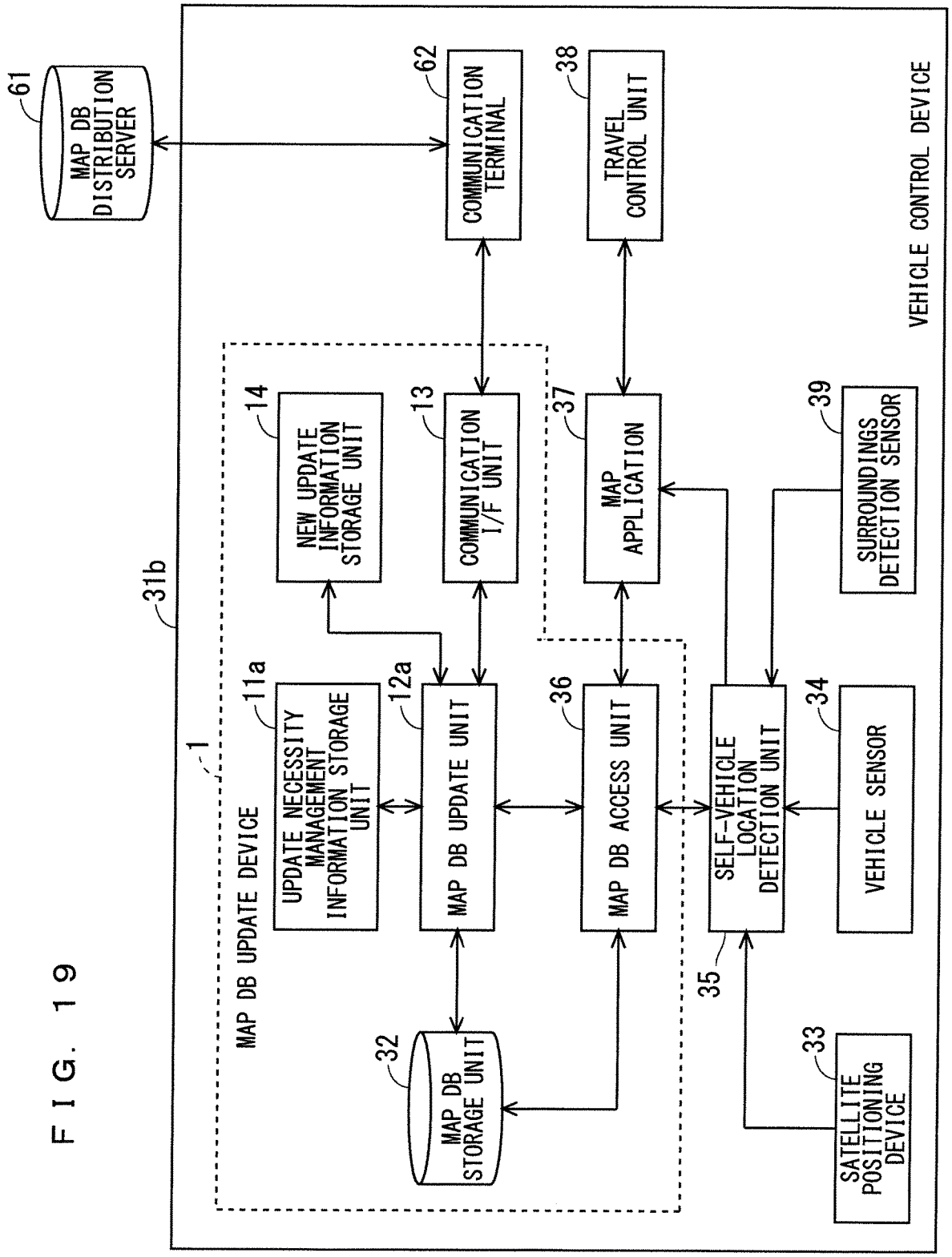
FIG. 19 is a block diagram showing a configuration of a vehicle control device in accordance with a fourth preferred embodiment.

FIG. 19 is a block diagram showing a configuration of a vehicle control device 31b including the map DB update device 1 which is the map data update device, and the like in accordance with the fourth preferred embodiment. Hereinafter, among constituent elements in accordance with the fourth preferred embodiment, the constituent elements identical to or similar to those described above will be represented by the same or similar reference signs, and different constituent elements will be mainly described.

The map DB update device 1 of the present fourth preferred embodiment has the same configuration as that of the map DB update device 1 (FIG. 13) of the third preferred embodiment except that the map DB storage unit 32 and the map DB access unit 36 are further included. Even with such a configuration, the same effect as that of the third preferred embodiment can be produced. Further, the configuration of the map DB update device 1 is not limited to the configuration of FIG. 13 or that of FIG. 19. The map DB update device 1 of the vehicle control device 31*b*, for example, may have a configuration further including at least one of the map DB storage unit 32, the self-vehicle location detection unit 35, and the map DB access unit 36. In other words, the map DB update device 1 of the vehicle control device 31*b* may have a configuration further including a constituent element (constituent elements) other than the map DB update device 1, among the constituent elements of the vehicle control device 31*b* shown in FIG. 13.

Further, though the present fourth preferred embodiment has the configuration in which the vehicle control device 31*b* (FIG. 13) described in the third preferred embodiment is changed, the fourth preferred embodiment may have a configuration in which the in-vehicle terminal 31*a* (FIG. 3) described in the second preferred embodiment is changed in the same manner. For example, the map DB update device 1 of the in-vehicle terminal 31*a* may have a configuration further including at least one of the map DB storage unit 32, the self-vehicle location detection unit 35, and the map DB access unit 36. In other words, the map DB update device 1 of the in-vehicle terminal 31*a* may have a configuration further including a constituent element (constituent elements) other than the map DB update device 1, among the constituent elements of the in-vehicle terminal 31*a* shown in FIG. 3.

<Other Variations>

Figure 20:
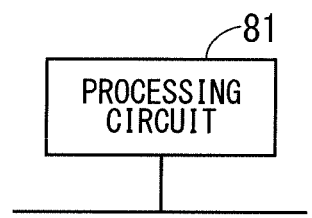
FIG. 20 is a block diagram showing a hardware configuration of a map DB update device in accordance with other variation.

The above-described storage unit 11 and the update unit 12 shown in FIG. 1 are hereinafter referred to as the "update unit 12 and the like". The update unit 12 and the like are implemented by a processing circuit 81 shown in FIG. 20. Specifically, the processing circuit 81 includes the storage unit 11 for storing the update necessity management file and the update unit 12 for updating the specific mesh file on the basis of the mesh ID of the specific mesh file and the update necessity management file and updating the update necessity management file on the basis of the update result of the specific mesh file and the received information received from the map DB distribution server 61. To the processing circuit 81, a dedicated hardware may be applied, or a processor which executes a program stored in a memory may be applied. As the processor, for example, used is a central processing unit, a processing unit, an arithmetic unit, a microprocessor, a microcomputer, a DSP (Digital Signal Processor), or the like.

When the processing circuit 81 is a dedicated hardware, the processing circuit 81 corresponds to, for example, a single circuit, a complex circuit, a programmed processor, a multiple programmed processor, an ASIC (Application Specific Integrated Circuit), an FPGA (Field Programmable Gate Array), or a combination of these circuits. Respective functions of the update unit 12 and the like may be implemented by circuits into which the processing circuit is decentralized, or these functions may be collectively implemented by one processing circuit.

Figure 21:
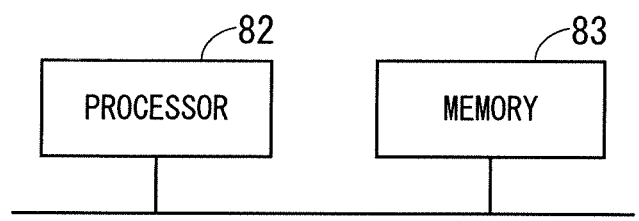
FIG. 21 is a block diagram showing a hardware configuration of the map DB update device in accordance with other variation.

When the processing circuit 81 is a processor, the functions of the update unit 12 and the like are implemented by a combination with software or the like. The software or the like corresponds to, for example, software, firmware, or software and firmware. The software or the like is described as a program and stored in a memory. As shown in FIG. 21, a processor 82 applied to the processing circuit 81 reads out and executes the program stored in a memory 83, to thereby implement the respective functions of the constituent elements. Specifically, the map DB update device 1 includes the memory 83 which stores programs which are executed by the processing circuit 81 to consequently perform the step of storing the update necessity management file and the step of updating the specific mesh file on the basis of the mesh ID of the specific mesh file and the update necessity management file and updating the update necessity management file on the basis of the update result of the specific mesh file and the received information received from the map DB distribution server 61. In other words, the program is executed to cause a computer to perform a procedure or a method of the update unit 12 and the like. Herein, the memory 83 may be, for example, a nonvolatile or volatile semiconductor memory such as a RAM (Random Access Memory), a ROM (Read Only Memory), a flash memory, an EPROM (Erasable Programmable Read Only Memory), an EEPROM (Electrically Erasable Programmable Read Only Memory), or the like, a HDD (Hard Disk Drive), a magnetic disk, a flexible disk, an optical disk, a compact disk, a mini disk, or a DVD (Digital Versatile Disc) and a drive unit thereof, or the like, or every storage medium which can be used in the future.

The case has been described above where the respective functions of the update unit 12 and the like are implemented by one of hardware and software or the like. This is, however, only one exemplary case, and there may be a case where some part of the update unit 12 and the like is implemented by a dedicated hardware and the other part is implemented by software or the like. For example, there may be a case where the function of the update unit 12 is implemented by the processing circuit 81 as the dedicated hardware and an interface or the like, and the respective functions of the constituent elements other than the update unit 12 are implemented when the processing circuit 81 as the processor 82 reads and executes the programs stored in the memory 83.

As described above, the processing circuit 81 can implement the above-described functions by hardware, software or the like, or a combination thereof.

Further, the above-described map DB update device 1 can be also applied to a map DB update system which is configured as a system by combining, as appropriate, a PND (Portable Navigation Device), a navigation device, a vehicle device such as a travel control device for performing the ADAS function or the AD function, or the like, a communication terminal including a portable terminal such as a cellular phone, a smartphone, a tablet, or the like, a function of an application installed in at least one of the vehicle device and the communication terminal, and a server. In this case, the functions or the constituent elements of the above-described map DB update device 1 may be arranged, being decentralized into these devices constituting the system, or may be arranged, being centralized into any one device.

Further, the preferred embodiments and variations may be freely combined, or may be changed or omitted as appropriate, without departing from the scope of the invention.

While the present disclosure has been shown and described in detail, the foregoing description is in all aspects illustrative and not restrictive. It is therefore understood that numerous modifications and variations can be devised.

EXPLANATION OF REFERENCE SIGNS 1 map DB update device, 11 storage unit, 12 update unit, 32 map DB storage unit, 35 self-vehicle location detection unit, 36 map DB access unit, 61 map DB distribution server

The invention claimed is:

1. A map data update apparatus for selectively updating a plurality of mesh files each corresponding to one or more of a plurality of meshes obtained by dividing map data, by performing communication with a server, comprising:
    a storage unit configured to store an update necessity management file having a bit array in which respective positions of a plurality of bits are associated with respective mesh IDs of the plurality of mesh files, in which 1-bit flag information indicating the necessity of an update of the mesh file is stored at the position corresponding to the mesh ID of the mesh file in the bit array; and
    an update unit configured to update a specific mesh file which is a mesh file specified by a map application as a target used in a vehicle among the plurality of mesh files, on the basis of a mesh ID of the specific mesh file and the update necessity management file, and updating the update necessity management file on the basis of an update result of the specific mesh file and received information received from the server; and
    a map data access unit configured to search for a route on which the vehicle travels, on the basis of a normal accuracy map data and to specify the specific mesh file on the basis of the route and transmit the specific mesh file to the map application,
    wherein the map data includes the normal accuracy map data, high accuracy map data having an accuracy higher than that of the normal accuracy map data, and facility map data used for specifying a location of the vehicle, and
    wherein the high accuracy map data after being processed by the update unit is used by the map application and travel control unit to control a travel of the vehicle.

2. The map data update apparatus according to claim 1, wherein
    received information from the server includes the update file having a data format identical to a data format of the update necessity management file, in which the necessity of the update of the mesh file is set on the basis of the difference between the map data of the first version and the map data of the second version, and
    the update circuitry performs a bit operation for updating the update necessity management file on the basis of the update file and the update necessity management file.

3. The map data update apparatus according to claim 2, wherein
    the update circuitry performs a bitwise OR operation as the bit operation when the flag information having a value of "1" indicates "update-needed" and the flag information having a value of "0" indicates "update-unneeded" in the update necessity management file, and performs a bitwise AND operation as the bit operation when the flag information having a value of "0" indicates "update-needed" and the flag information having a value of "1" indicates "update-unneeded" in the update necessity management file.

4. The map data update apparatus according to claim 1, wherein
    received information from the server includes the version management file, and the update circuitry generates the update file having a data format identical to a data format of the update necessity management file, in which the necessity of the update of the mesh file is set on the basis of the difference between the version management file of the first version and the version management file of the second version, and performs a bit operation for updating the update necessity management file on the basis of the update file and the update necessity management file.

5. The map data update apparatus according to claim 1, wherein
    the storage includes a nonvolatile memory and a high-speed memory whose processing speed is higher than that of the nonvolatile memory, and
    the update circuitry loads at least part of the update necessity management file stored in the nonvolatile memory into the high-speed memory as an update necessity management work file at a predetermined start timing,
    updates the specific mesh file on the basis of the mesh ID of the specific mesh file and the update necessity management work file,
    updates the update necessity management work file on the basis of the received information received from the server and the update result of the specific mesh file, and
    stores the update necessity management work file into the nonvolatile memory as the at least part of the update necessity management file at a predetermined end timing.

6. The map data update apparatus according to claim 5, wherein
    the at least part of the update necessity management file is part of the update necessity management file, and
    the part of the update necessity management file includes a partial file used for managing a vehicle location mesh file which is the mesh file in which the vehicle is located.

7. The map data update apparatus according to claim 5, wherein
    the update necessity management work file includes
    a first update necessity management work file used for managing a vehicle location mesh file which is the mesh file in which the vehicle is located, and
    a second update necessity management work file used for managing the mesh file in the surroundings of the vehicle location mesh file, which is wider than the vehicle location mesh file,
    the high-speed memory includes
    a first high-speed memory into which the first update necessity management work file is loaded, and
    a second high-speed memory into which the second update necessity management work file is loaded, and
    the first high-speed memory has a processing speed higher than the second high-speed memory.

8. The map data update apparatus according to claim 5, wherein
    the map data includes
    normal accuracy map data,
    high accuracy map data having an accuracy higher than that of the normal accuracy map data, and
    facility map data used for specifying a location of the vehicle,
    the update necessity management work file includes
    first, second, and third update necessity management work files used for managing the plurality of mesh files of the high accuracy map data, the facility map data, and the normal accuracy map data, respectively, and the high-speed memory includes first, second, and third high-speed memories which are different in the processing speed from one another, into which the first, second, and third update necessity management work files are loaded, respectively.

9. The map data update apparatus according to claim 1, wherein the update circuitry updates the specific mesh file and the update necessity management file individually in at least two of the normal accuracy map data, the high accuracy map data, and the facility map data.

10. The map data update apparatus according to claim 9, wherein the size of the mesh is different between at least two of the normal accuracy map data, the high accuracy map data, and the facility map data.

11. The map data update apparatus according to claim 1, further comprising:

vehicle location detection circuitry for detecting a location of the vehicle, which is used for controlling a travel of the vehicle, on the basis of the facility map data after being processed by the update circuitry and information on surroundings of the vehicle, which is detected by a sensor of the vehicle.

12. The map data update apparatus according to claim 1, further comprising:

a map data storage for storing the map data.

13. A map data update method of a map data update apparatus for selectively updating a plurality of mesh files each corresponding to one or more of a plurality of meshes obtained by dividing map data, by performing communication with a server, comprising:

storing an update necessity management file having a bit array in which respective positions of a plurality of bits are associated with respective mesh IDs of the plurality of mesh files, in which 1-bit flag information indicating the necessity of an update of the mesh file is stored at the position corresponding to the mesh ID of the mesh file in the bit array; and updating a specific mesh file which is a mesh file specified by a map application as a target used in a vehicle among the plurality of mesh files, on the basis of a mesh ID of the specific mesh file and the update necessity management file, and updating the update necessity management file on the basis of an update result of the specific mesh file and an update file in which the necessity of the update of the mesh file is set on the basis of a difference between the map data of a first version and the map data of a second version immediately before the first version or in which the necessity of the update of the mesh file is set on the basis of a difference between a version management file of a first version and a version management file of a second version immediately before the first version, the version management file storing respective versions of the plurality of mesh files, searching for a route on which the vehicle travels, on the basis of a normal accuracy map data and specifying the specific mesh file on the basis of the route and transmitting the specific mesh file to the map application, wherein the map data includes the normal accuracy map data, high accuracy map data having an accuracy higher than that of the normal accuracy map data, and facility map data used for specifying a location of the vehicle, and wherein the high accuracy map data after being processed by the update unit is used by the map application and travel control unit to control a travel of the vehicle.

* * * * *